(12) United States Patent
Ohta

(10) Patent No.: US 9,696,070 B2
(45) Date of Patent: Jul. 4, 2017

(54) FLOW RATE ADJUSTMENT VALVE FOR REFRIGERATION CYCLE

(71) Applicant: DENSO CORPORATION, Kariya, Aichi-pref. (JP)

(72) Inventor: Hiromi Ohta, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 293 days.

(21) Appl. No.: 14/398,357

(22) PCT Filed: Apr. 30, 2013

(86) PCT No.: PCT/JP2013/062665
§ 371 (c)(1),
(2) Date: Oct. 31, 2014

(87) PCT Pub. No.: WO2013/172201
PCT Pub. Date: Nov. 21, 2013

(65) Prior Publication Data
US 2015/0135749 A1 May 21, 2015

(30) Foreign Application Priority Data

May 14, 2012  (JP) .................................. 2012-110820
Apr. 12, 2013  (JP) .................................. 2013-083829

(51) Int. Cl.
*F25B 41/04* (2006.01)
*F16K 11/048* (2006.01)
(Continued)

(52) U.S. Cl.
CPC ............. *F25B 41/04* (2013.01); *F16K 11/02* (2013.01); *F16K 11/04* (2013.01); *F16K 11/044* (2013.01);
(Continued)

(58) Field of Classification Search
CPC ...... F25B 41/04; F25B 41/043; F25B 41/062; F25B 49/02; F25B 2341/0662;
(Continued)

(56) References Cited

U.S. PATENT DOCUMENTS 2,463,951 A  *  3/1949  Carter .................. F25B 41/062
                                                      236/92 B
3,252,294 A     5/1966  Heidorn
(Continued)

FOREIGN PATENT DOCUMENTS

JP    S5740423 B2    8/1982
JP    S60004047 U    1/1985
(Continued)

OTHER PUBLICATIONS

International Search Report (in Japanese with English Translation) for PCT/JP2013/062665, mailed Jul. 30, 2013; ISA/JP.
(Continued)

*Primary Examiner* — Marc Norman
(74) *Attorney, Agent, or Firm* — Harness, Dickey & Pierce, P.L.C.

(57) ABSTRACT

A flow rate regulation valve is used for a refrigeration cycle device for air conditioning. The flow rate regulation valve is constituted by: an inlet flow rate control valve connected to the inlet side of an inside evaporator and functioning in the refrigeration cycle device as an expansion valve for depressurizing and expanding a refrigerant flowing into the inside evaporator; and an outlet flow rate adjustment valve connected to the outlet side of the inside evaporator and functioning as an evaporation pressure adjustment valve for adjusting evaporation pressure in the inside evaporator to a predetermined target pressure at which frost is not formed. The flow rate regulation valve is characterized in that, when the opening of one of the inlet flow rate control valve and the
(Continued)

outlet flow rate adjustment valve increases, the flow rate regulation valve displaces so that the opening of the other decreases.

13 Claims, 23 Drawing Sheets

(51) Int. Cl.
| | |
|---|---|
| *F25B 5/04* | (2006.01) |
| *F25B 41/06* | (2006.01) |
| *F16K 11/02* | (2006.01) |
| *F16K 11/044* | (2006.01) |
| *F16K 11/085* | (2006.01) |
| *F16K 27/00* | (2006.01) |
| *F16K 27/02* | (2006.01) |
| *F25B 49/02* | (2006.01) |
| *F25B 1/00* | (2006.01) |
| *F16K 11/04* | (2006.01) |

(52) U.S. Cl.
CPC ........ *F16K 11/048* (2013.01); *F16K 11/0856* (2013.01); *F16K 27/003* (2013.01); *F16K 27/029* (2013.01); *F16K 27/0263* (2013.01); *F25B 1/00* (2013.01); *F25B 5/04* (2013.01); *F25B 41/043* (2013.01); *F25B 41/06* (2013.01); *F25B 41/062* (2013.01); *F25B 49/02* (2013.01); *F25B 2341/0653* (2013.01); *F25B 2341/0662* (2013.01); *F25B 2400/0409* (2013.01); *F25B 2400/0411* (2013.01); *F25B 2500/18* (2013.01); *F25B 2600/2501* (2013.01); *F25B 2600/2513* (2013.01); *F25B 2600/2515* (2013.01); *F25B 2700/195* (2013.01); *F25B 2700/21152* (2013.01); *F25B 2700/21163* (2013.01); *F25B 2700/21174* (2013.01); *Y02B 30/72* (2013.01)

(58) Field of Classification Search
CPC ...... F25B 2400/0411; F25B 2600/2513; F25B 2600/2515; F16K 11/02; F16K 11/04; F16K 11/044; F16K 11/048; F16K 27/006
See application file for complete search history.

(56) References Cited

U.S. PATENT DOCUMENTS

| | | | | | |
|---|---|---|---|---|---|
| 3,640,086 | A | * | 2/1972 | Brody | F24F 5/001 62/210 |
| 3,785,554 | A | * | 1/1974 | Proctor | F16K 17/38 236/34 |
| 3,855,836 | A | * | 12/1974 | Takahashi | F25B 41/04 62/217 |
| 4,442,680 | A | * | 4/1984 | Barbier | F25B 41/043 137/489.5 |
| 5,182,920 | A | * | 2/1993 | Matsuoka | F25B 41/043 62/206 |
| 2013/0312447 | A1 | | 11/2013 | Inaba et al. | |

FOREIGN PATENT DOCUMENTS

| | | |
|---|---|---|
| JP | H06341732 A | 12/1994 |
| JP | 2781064 B2 | 5/1998 |
| JP | 2003014153 A | 1/2003 |
| JP | 2003080931 A | 3/2003 |
| JP | 2004156812 A | 6/2004 |
| JP | 3645324 B2 | 2/2005 |
| JP | 2012181005 A | 9/2012 |

OTHER PUBLICATIONS

Office Action dated Jun. 7, 2016 in corresponding Japanese Application No. 2013-083829 with English translation.

* cited by examiner

ELECTRIC EXPANSION VALVE

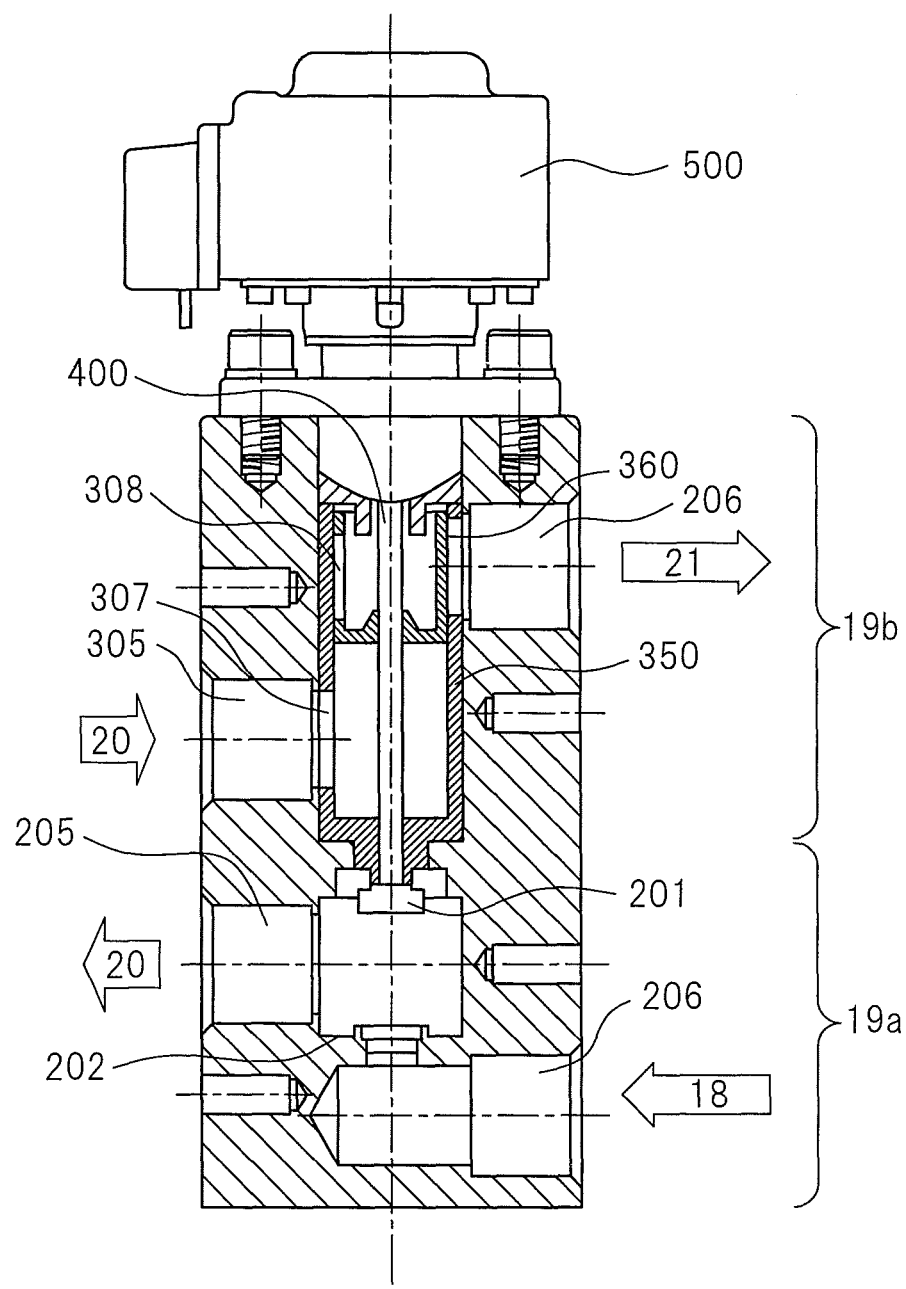

D-D CROSS-SECTION

FLOW RATE ADJUSTMENT VALVE FOR REFRIGERATION CYCLE

CROSS REFERENCE TO RELATED APPLICATIONS

This application is a U.S. National Phase Application under 35 U.S.C. 371 of International Application No. PCT/JP2013/062665 filed on Apr. 30, 2013 and published in Japanese as WO 2013/172201 A1 on Nov. 21, 2013. This application is based on and claims the benefit of priority from Japanese Patent Applications No. 2013-083829 filed Apr. 12, 2013 and No. 2012-110820 filed May 14, 2012. The entire disclosures of all of the above applications are incorporated herein by reference.

TECHNICAL FIELD

The present invention relates to a flow regulating valve which regulates a flow rate of a refrigerant which flows to an evaporator of a refrigeration cycle.

BACKGROUND ART

PLT 1 shows a refrigeration cycle which is provided with a cooling operation mode and a "dehumidifying heating mode" described hereafter and enables switching between them. The cooling operation mode is a mode where an inside evaporator which is arranged at the inside of the compartment is used to cool the air which is blown to the inside of the compartment to cool the passenger compartment. The "dehumidifying heating mode" of this PLT 1 is a refrigerant circuit wherein an inside evaporator, and an outside heat exchanger which exchanges heat of a refrigerant with the outside air are connected in parallel at the downstream side of the inside condenser. Due to this, the outside heat exchanger and inside evaporator are made to function as heat absorbers. The inside evaporator absorbs heat from the fan air for a dehumidifying action. The inside condenser reheats the fan air and vents it to the inside for a heating and dehumidifying action.

In this PLT 1, an embodiment of use of an evaporation pressure regulator 12 at the outlet side of the inside evaporator 2 is shown. In both the cooling operation mode and dehumidifying heating mode, refrigerant flows to the evaporation pressure regulator. As an evaporation pressure regulator (also called "EPR"), a spring type evaporation pressure regulator (as one example, Japanese Patent No. 2781064 etc.) has been used. This holds the evaporation pressure of the refrigerant inside the evaporator at a certain pressure or more to prevent formation of frost of the inside evaporator (freezing of the moisture from dehumidification). That is, if the evaporation pressure of the refrigerant inside the evaporator falls, simultaneously the evaporation temperature falls (on the isobaric line at the two-phase region on a Mollier chart, the temperature is also constant), so frost ends up being formed. Therefore, in the spring type evaporation pressure regulator, the evaporation pressure of the refrigerant in the evaporator is held at a constant pressure or more.

In PLT 1, in both the cooling operation mode and "dehumidifying heating mode", the evaporation pressure regulator controls the evaporation pressure of the refrigerant in the evaporator to a predetermined setting or more so as to prevent frost. However, in the prior art, a well known spring type evaporation pressure regulator (EPR) was used, so there were the following problems.

(1) The fins or tubes at the air side are cooled by conduction of heat from the inside refrigerant temperature, so when the air which is blown is high in temperature, the temperature difference between the temperature of the fins or tubes and the inside refrigerant temperature becomes large. In a spring type evaporation pressure regulator, the evaporation pressure is set to a constant pressure and control cannot be performed to lower the evaporation pressure (that is, evaporation temperature), so in the summer etc. when the air which is blown is high in temperature, the fins or tubes become high in temperature and the vented air temperature also ends up becoming higher. For this reason, it is not possible to suitably make use of the cooling capacity.

(2) The spring type evaporation pressure regulator uses a valve element (piston) which adjusts the refrigerant flow rate and a coil spring which biases the valve element in the closing direction. If the refrigerant flow rate is large, the opening of the valve element becomes larger. This means compressing the coil spring (opening of valve element and spring pressure are proportional). That is, the evaporation pressure of the refrigerant rises. Conversely, if the refrigerant flow rate is small, the opening of the valve element becomes small and the evaporation pressure also becomes low. For this reason, in order to prevent formation of frost of the evaporator, the setting has to be determined, when refrigerant flow rate is small, i.e., where the evaporation pressure (evaporation temperature) becomes the lowest. By doing this, in the summer season etc. when the refrigerant flow rate is large, the opening of the valve element becomes large and the evaporation pressure (evaporation temperature) also ends up becoming high. For this reason, the vented air temperature also ends up becoming higher, so it is not possible to suitably make use of the cooling capacity. That is, when the flow rate is large, inherently, if changing to a target value of a lower refrigerant temperature, a suitable cooling capacity should be able to be realized, but that is not so.

(3) When detecting the vented air temperature from the evaporator and using control to adjust the amount of discharge refrigerant of the compressor, if there is a spring type evaporation pressure regulator, the vented air temperature no longer falls to the set evaporation pressure (set evaporation temperature) of the evaporation pressure regulator or less. For this reason, even if the cooling load falls, the vented air temperature does not fall, so the speed of the electric compressor and the discharge capacity of the variable discharge compressor do not fall, the power increases more than necessary, and the COP ends up falling. Further, the fan air flow also does not fall and blowing of air continues unnecessarily.

(4) The spring type evaporation pressure regulator closes at a set pressure or less (usually, saturation pressure of HFC134a at 0° C. of 292.8220 kPa[abs] or less). For this reason, when filling refrigerant in the refrigeration cycle, the inside is evacuated to discharge the air, but if the evaporation pressure regulator closes, there is the problem that a long time is taken for evacuation.

(5) If gas leakage etc. causes a drop in the amount of refrigerant in the refrigeration cycle, the liquid refrigerant in the accumulator disappears, the pressure in the evaporator drops, the opening of the spring type evaporation pressure regulator is reduced, and the compressor inlet pressure also falls. Due to this, there is the problem of a rise in the degree of overheating of the refrigerant which is sucked into the compressor and a rise in the discharge temperature due to an increase in the compression ratio.

(6) In a cycle which switches between cooling and heating, if a dehumidifying operation is not required at the time of heating, sometimes the evaporator inlet is closed by a solenoid valve, expansion valve, etc. to prevent refrigerant from flowing to the evaporator. When the compressor inlet pressure is low, the spring type evaporation pressure regulator automatically closes, so refrigerant pools inside the evaporator and sometimes the amount of refrigerant in the accumulator becomes insufficient. Further, when the air which is blown to the evaporator changes from the outside air to the inside air and the evaporator is heated, the refrigerant at the inside of the evaporator rapidly evaporates and the refrigerant flow rate increases, so there is the problem that fluctuations in vented temperature and fluctuations in compressor power occur.

Furthermore, with the cycle configuration of PLT 1 where different operation modes such as cooling and heating are switched between, pluralities of expansion valves and evaporation pressure regulators have to be used. Not only was there a problem in the increased number of parts and mountability, but also interference occurred between the evaporation pressure regulator and control for adjusting the amount of discharge refrigerant of the compressor.

CITATIONS LIST

Patent Literature

PLT 1: Japanese Patent No. 3645324

SUMMARY OF INVENTION

Technical Problem

The present invention, in view of the above problem, provides a flow regulating valve for inside evaporator use which functions both as an electric evaporation pressure regulator for frost control use and an expansion valve of a refrigeration cycle.

Solution to Problem

To solve this problem, the invention of claim 1 provides a flow regulating valve (19) which is used in a refrigeration cycle system for air-conditioning use which has an inside condenser (12), outside heat exchanger (15), and inside evaporator (20), wherein the flow regulating valve (19) comprises an inlet flow control valve (19a) which is connected to an inlet side of the inside evaporator (20) and functions as an expansion valve which reduces a pressure of and expands a refrigerant which flows into the inside evaporator in the refrigeration cycle system and an outlet flow regulating valve (19b) which is connected to an outlet side of the inside evaporator (20) and functions as an evaporation pressure regulator which adjusts the pressure to a predetermined target pressure where no frost forms in the inside evaporator (20), and the inlet flow control valve (19a) and the outlet flow regulating valve (19b) displace so that when the valve opening of one increases, the valve opening of the other decreases.

Note that, the above reference notations are examples which show the correspondence with specific examples which are described in the later explained embodiments.

BRIEF DESCRIPTION OF DRAWINGS

FIG. 13A is a cross-sectional view of a flow regulating valve of a seventh embodiment of the present invention (when inlet flow control valve 19a is closed).

DESCRIPTION OF EMBODIMENTS

Figure 1A:
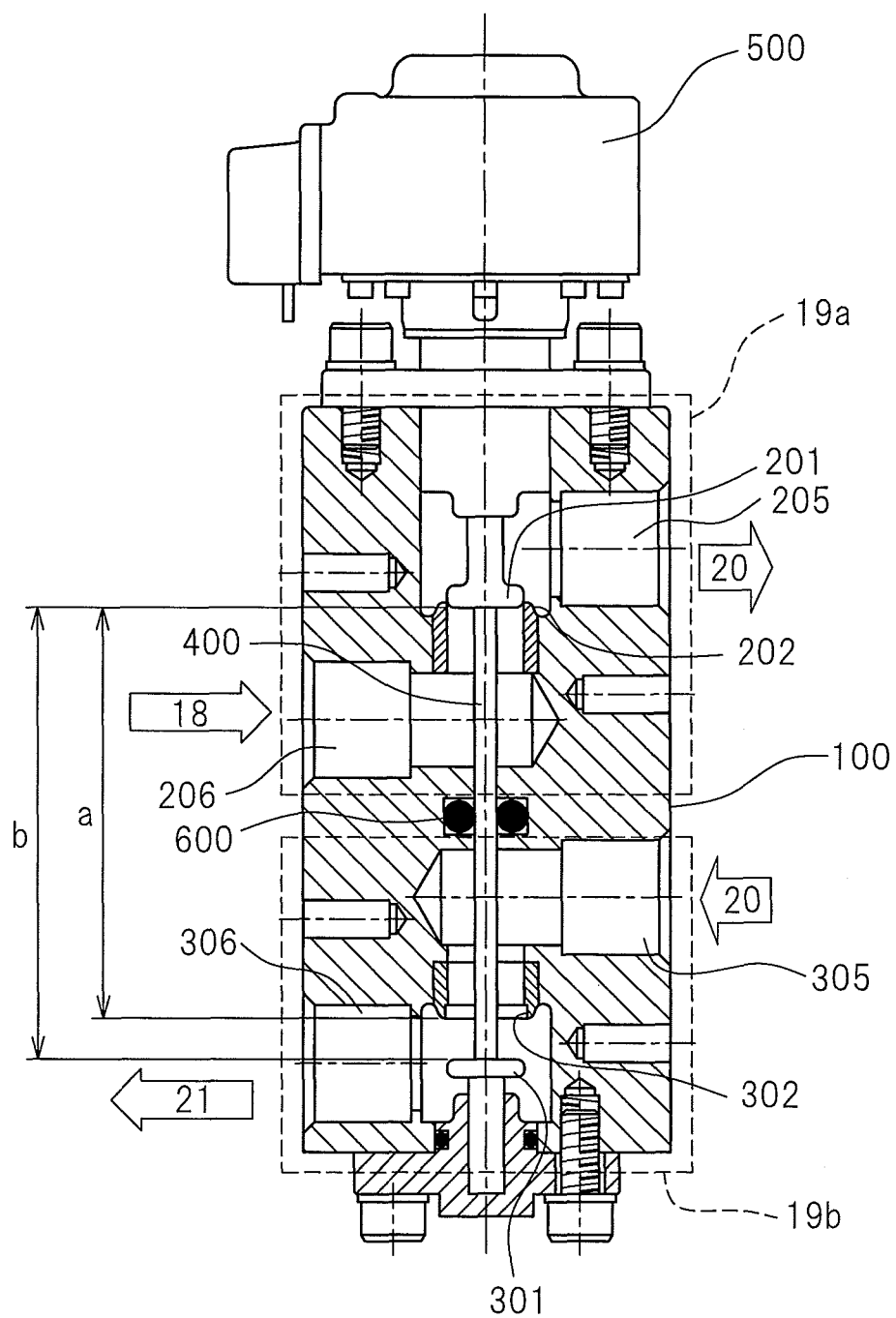
FIG. 1A is a cross-sectional view of a flow regulating valve of a first embodiment of the present invention (when inlet flow control valve 19a is closed).

Below, referring to the drawings, embodiments of the present invention will be explained. In the embodiments, the same component parts are assigned the same reference notations and explanations are omitted.
(First Embodiment)

Figure 1B:
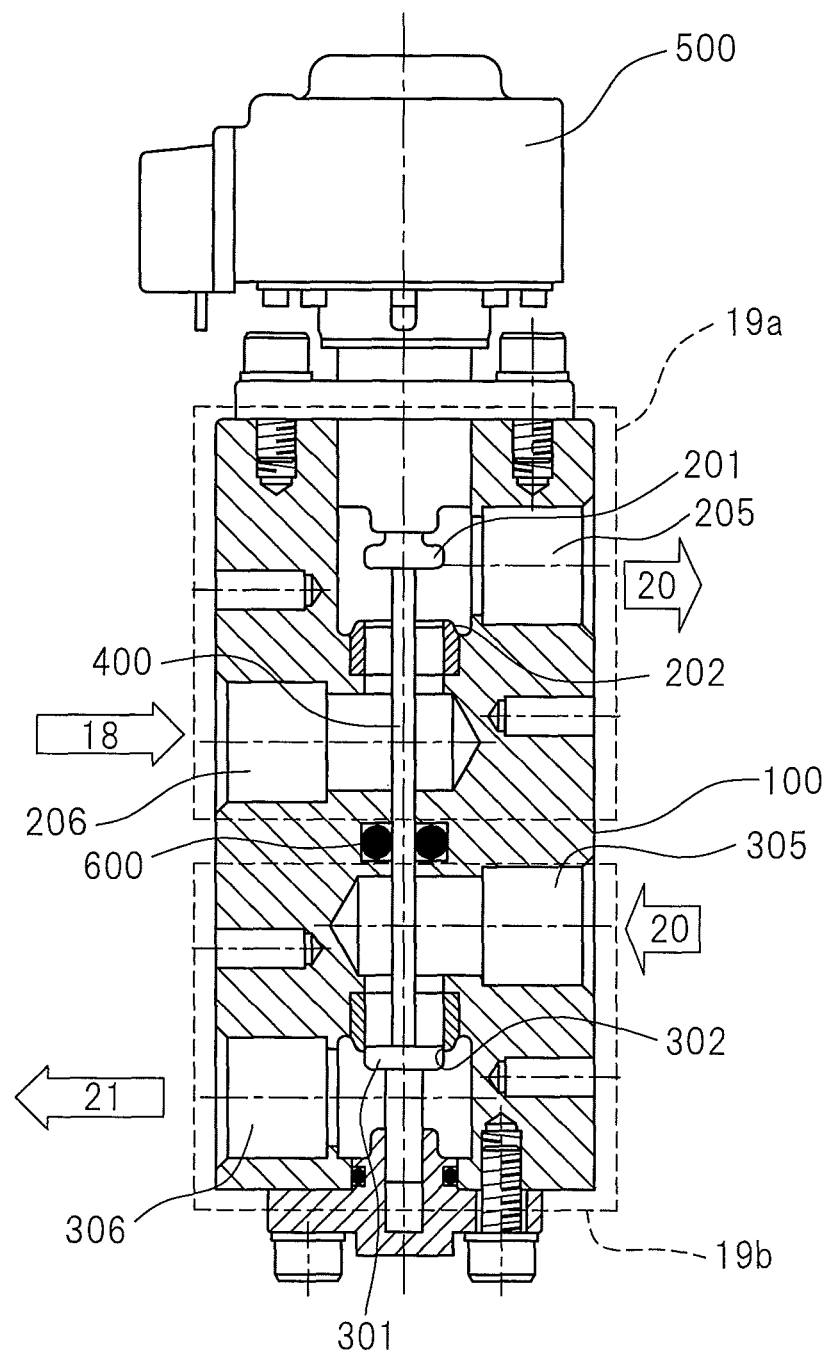
FIG. 1B is a cross-sectional view of a flow regulating valve of a first embodiment of the present invention (when outlet flow regulating valve 19b is closed).

The flow regulating valve of the present embodiment, as shown in FIGS. 1A and 1B, is a flow regulating valve which functions as both an electric evaporation pressure regulator for frost control and an expansion valve of a refrigeration cycle. The frost control in the present embodiment relates to an inside evaporator. Normally, the outside heat exchanger has a defrosting device which heats frozen moisture to melt it, but in the case of the inside evaporator, the frozen moisture is heated and part becomes steam which ends up being vented to the passenger compartment causing the window glass to fog up, so means for preventing frosting is necessary as a safety measure at the time of operation. Conventional frost preventing means included ones which used a spring type evaporation pressure regulator and ones which adjusted the amount of discharge refrigerant of the compressor (capacity or speed). Each was for a cooling operation.

As opposed to this, the flow regulating valve of the present embodiment is not limited to a cooling operation and, as explained later, can function as an expansion valve and prevent frost in the different modes. That is, in control by the flow regulating valve of the present embodiment, it is made possible to switch between the evaporation pressure regulator (EPR) system which controls a single control motor by electric control and a discharge refrigerant rate adjustment system of a compressor. Below, the structure of a flow regulating valve of the present embodiment will be explained by FIGS. 1A and 1B, while the actions performed in the different operation modes of the flow regulating valve of the present invention will be explained in FIGS. 2 to 7.

Referring to FIGS. 1A and 1B, in the body 100, an inlet flow control valve 19a which is connected to the evaporator inlet side and the outlet flow regulating valve 19b which is connected to the evaporator outlet side are provided. A valve element 201 of the inlet flow control valve 19a and a valve element 301 of the outlet flow regulating valve 19b are joined together by a connecting shaft 400 in facing directions. The valve element 201 of the inlet flow control valve 19a is driven by a control motor (step motor) 500 to any position in the up-down direction of FIG. 1A. The valve element 301 of the outlet flow regulating valve 19b also displaces by the same amount of movement through a connecting shaft 400.

The distance "b" between the valve element 201 and the valve element 301 becomes larger than the distance "a" between the valve seat part 202 of the inlet flow control valve 19a and the valve seat part 302 of the outlet flow regulating valve 19b which are provided at the body 100. For this reason, if driving the valve element 201 in the closing direction (downward direction of FIG. 1A), the valve element 301 separates from the valve seat part 302 and moves in the valve opening direction. The valve element 201 is made to move to a position where it contacts the valve seat 202 to set a closed state. At this time, the valve element 301 and the valve seat 302 become separated the most resulting in a wide open state.

Figure 1C:
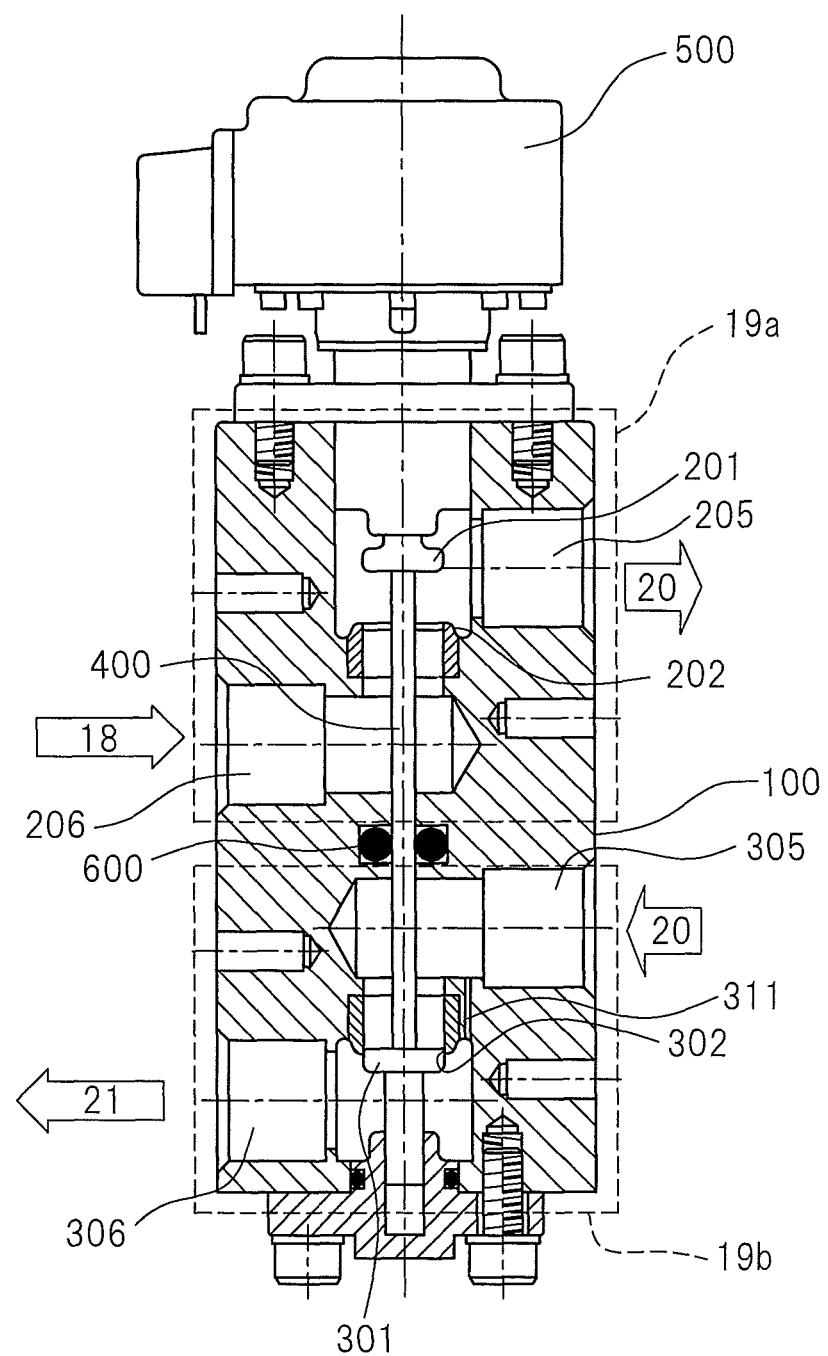
FIG. 1C is a cross-sectional view of a flow regulating valve in which a bypass flow path is set in a first embodiment of the present invention (when outlet flow regulating valve 19b is closed).

Conversely, if making the valve element 201 move in the reverse direction (up direction of FIG. 1A) and making the valve element 301 and the valve seat 302 the closed state, the valve element 201 and the valve seat 202 become wide open (see FIG. 1B). The connecting shaft 400 connects the inlet flow control valve 19a and the outlet flow regulating valve 19b, so to prevent refrigerant leakage between valves, an O-ring 600 is attached. As shown in FIG. 1C, in the present embodiment, the outlet flow regulating valve 19b may be provided with a bypass flow path (bleed port) 311 which allows a predetermined flow rate even when the valve is closed. This is so as to secure the minimum necessary flow rate of refrigerant even when the valve is closed and the opening is minute and enable the lubricant oil in the refrigerant to lubricate the compressor. Further, this is to prevent the hunting which can easily occur at the time of valve closing or the time of valve opening. The bypass flow path (bleed port) 311 is not limited to the present embodiment. It may also be provided in all of the later explained embodiments.

The actions and effects of the present embodiment will be explained in detail in the later explained operation modes, but when using the inlet flow control valve 19a as an expansion valve, the distance (amount of lift) between the valve element 201 and the valve seat 202 is adjusted in a state smaller than the distance between the valve element 301 and the valve seat 302 so adjust the amount of lift of the valve element 201 (this being referred to as the "control opening"). At this time, the distance between the valve element 301 and the valve seat 302 is secured sufficiently large so that in the range of adjustment of the amount of lift of the valve element 201, the pressure loss of the outlet flow regulating valve 19b does not change much at all.

When using the outlet flow regulating valve 19b as an evaporation pressure regulator (electric EPR), the distance (amount of lift) between the valve element 301 and the valve seat 302 is adjusted in a state smaller than the distance between the valve element 201 and the valve seat 202 so adjust the amount of lift of the valve element 301. Due to this, the inlet flow control valve 19a (expansion valve) and outlet flow regulating valve 19b (EPR) can be made integral and can be driven by a single actuator, so this is effective for reducing the cost, cutting the number of parts, and improving the mountability. Further, both of the inlet flow control valve 19a and the outlet flow regulating valve 19b are never simultaneously adjusted in flow rates (controlled), so interference never occurs with control for adjusting the amount of discharge refrigerant of the compressor. Note that, the control motor 500 may also use a servo motor or linear solenoid or other actuator in addition to a step motor.
(Second Embodiment)

A second embodiment of the present invention is an embodiment which is applied to a refrigeration cycle system 10 for air-conditioning a passenger compartment which is switched among different operating modes of the following cooling mode, heating mode, first dehumidifying heating mode, and second dehumidifying heating mode. Below, referring to FIGS. 2 to 7, the cooling mode, heating mode, first dehumidifying heating mode, and second dehumidifying heating mode will be explained and the functions of the above-mentioned flow regulating valve in the respective modes will be explained. Note that, the flow regulating valve of the first embodiment is not limited to this refrigeration cycle system and can be applied to other refrigeration cycle systems which are switched between different operation modes. Further, the flow regulating valves of the other embodiments which are explained later can be applied to not only this refrigeration cycle system, but also other refrigeration cycle systems.

Figure 2:
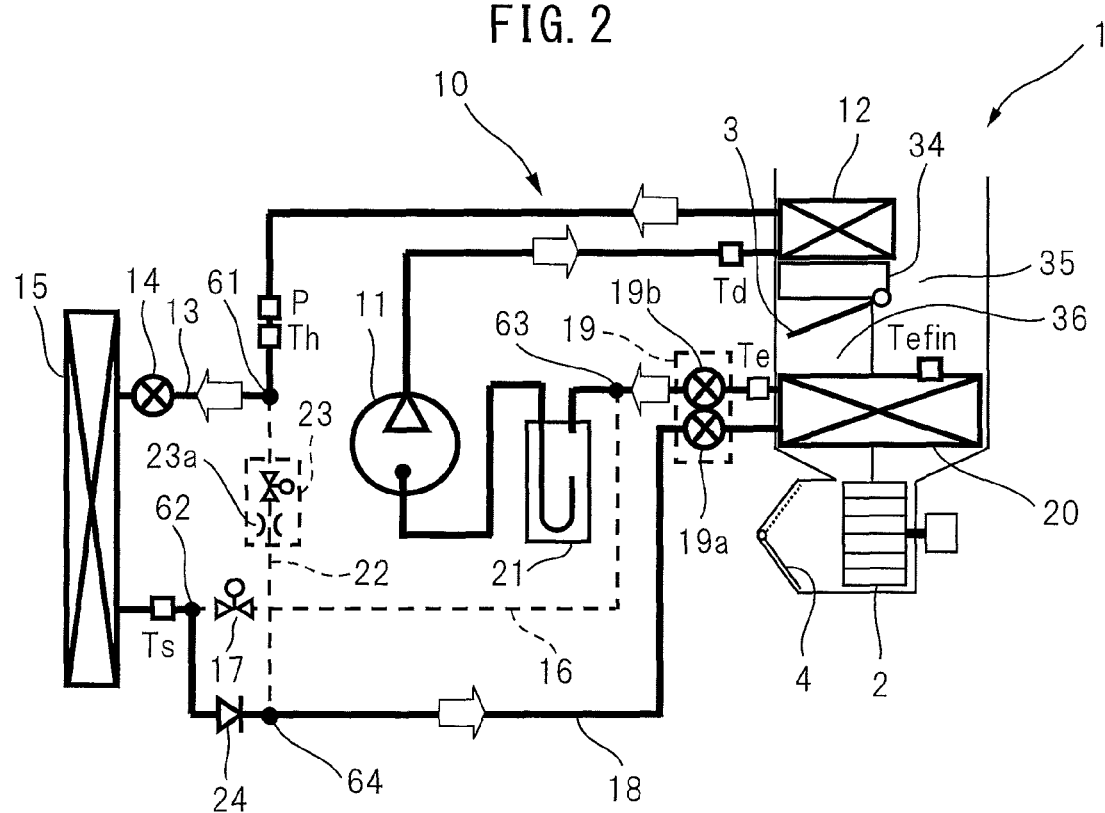
FIG. 2 is a view explaining the operation of a refrigeration cycle in a cooling mode of a second embodiment of the present invention.
Figure 3:
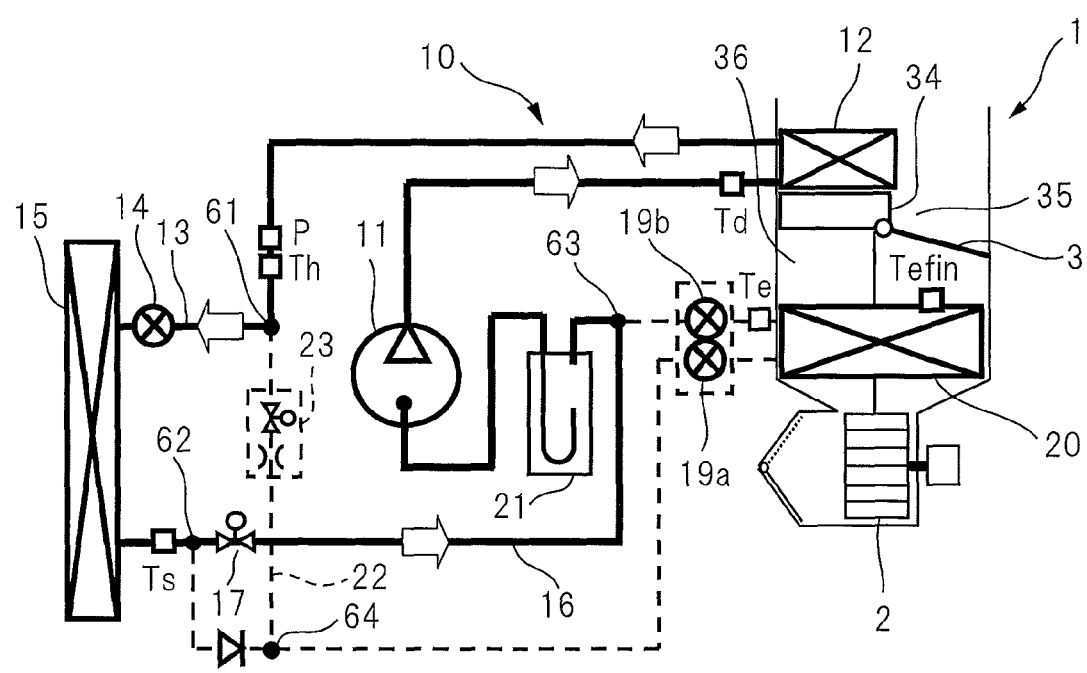
FIG. 3 is a view explaining the operation of a refrigeration cycle in a heating mode of a second embodiment of the present invention.

The overall configuration of the refrigeration cycle system 10 of the present embodiment becomes as follows next as seen in FIGS. 2 and 3 (including broken line parts). A main refrigerant circuit through which a refrigerant circulates is formed by a compressor 11, inside condenser 12, first expansion valve 14, outside heat exchanger 15, accumulator 21, and the compressor 11 arranged in that order. Note that, the accumulator 21 may be omitted or a receiver tank may be used at the condenser outlet. This main refrigerant circuit forms a heating mode as explained later. In this circuit, a first branching point 61 is provided between the inside condenser 12 and the first expansion valve 14 and, furthermore, a second branching point 62 is provided between the outside heat exchanger 15 and the accumulator 21. Downstream of the second branching point 62 before reaching the accumulator 21, a first shutoff valve 17 is set for switching the circuit. The passage from downstream of this second branching point 62 through the first shutoff valve 17 to the accumulator 21 will be referred to as the "second refrigerant passage 16".

Further, a passage runs from the second branching point 62 through the check valve 24, inlet flow control valve 19a, inside evaporator 20, and outlet flow regulating valve 19b and merges with the main refrigerant circuit at the first merging point 63 upstream of the accumulator 21. The passage from downstream of this second branching point 62 through the check valve 24 to the first merging point 63 will be referred to as the "third refrigerant passage 18". In the main refrigerant circuit, the passage from the first branching point 61 to the second branching point 62 will be referred to as the "first refrigerant passage 13". The second refrigerant passage 16 is also part of the main refrigerant circuit. Further, the passage from the first branching point 61 which connects with the third refrigerant passage 18 at the second merging point 64 downstream of the check valve 24 will be referred to as the "fourth refrigerant passage 22". A second shutoff valve 23 with a fixed venturi 23a is inserted. The circuit combining the fourth refrigerant passage 22 and the third refrigerant passage 18 from the second merging point 64 forms a bypass refrigerant circuit for the main refrigerant circuit. The passage from the second branching point 62 through the check valve 24 to the second merging point 64 forms the connection refrigerant passage.

At the inlet of the inside condenser 12, a temperature sensor Td is provided, while at the outlet, a pressure sensor P and a temperature sensor Th are provided. At the outlet of the outside heat exchanger 15, a temperature sensor Ts is provided. At the cooling fins of the inside evaporator 20, a temperature sensor Tefin is provided, while at the outlet, a temperature sensor Te is provided. In addition to these detection signals, sensors necessary for a car air-conditioning system (auto air-conditioning control system using target vent temperature TAO) are provided.

The car air-conditioning system which uses the refrigeration cycle system 10 of the present embodiment is provided with a heating, venting, and air-conditioning unit (HVAC) 1. The heating, venting, and air-conditioning unit 1 is arranged inside from an instrument panel at a frontmost part of the passenger compartment. Inside the air-conditioner case which forms an outer shell, a blower 2, inside evaporator 20 of the refrigeration cycle system 10, air mix door 3, and inside condenser 12 of the refrigeration cycle system 10 are housed. In the present embodiment, a heater core 34 which uses engine cooling water is provided together with the inside condenser 12 of the refrigeration cycle system 10 so as to heat the air-conditioning air. Note that, the heater core 34 may also be omitted.

At the upstream-most side of the flow of fan air of the heating, venting, and air-conditioning unit 1, a lead-in port which leads in the inside air (air inside passenger compartment) and the outside air (air outside passenger compartment) and an inside/outside air switching door 4 which switches between the inside air and the outside air are provided. At the downstream side of the flow of air of the inside evaporator 20, a heating use air passage 36 which runs air toward the inside condenser 12 and a cooling air bypass passage 35, that is, two air passages, are formed by a partition wall. An air mix door 3 is used to control the ratio of air flow. Furthermore, at the downstream side of these air passages, after a mixing space, vents are arranged which vent temperature adjusted air to the passenger compartment. As the vents for venting air to the passenger compartment, face vents which vent air toward the upper body of the passengers in the passenger compartment, foot vents which vent air toward the feet of the passengers, defrost vents (not shown) which vent air toward the inside surface of the front window glass of the vehicle (not shown), etc. are provided. As the heating, venting, and air-conditioning unit (HVAC), various examples of layout and structure are known. The above heating, venting, and air-conditioning unit 1 is not limited in layout and structure to those of the present embodiment.

The different modes in the car air-conditioning system which uses the refrigeration cycle system 10 of the present embodiment will be explained below.

Cooling Mode

In the cooling mode, a control device of the air-conditioning system uses the first shutoff valve 17 to close the second refrigerant passage 16 and uses the second shutoff valve 23 to close the fourth refrigerant passage 22. Furthermore, it uses the first expansion valve 14 to make the first refrigerant passage 13 the wide open state. Due to this, in the refrigeration cycle system 10, as the cooling mode, a refrigerant flow path such as shown by the arrows of FIG. 2 is switched to. By the configuration of this refrigerant flow path, the control device uses the target vent temperature TAO, the detection signals of the group of sensors, etc. as the basis to determine the operating states of the various control equipment which are connected to the control device (control signals which are output to the various control equipment).

For example, the refrigerant discharge ability of the compressor 11, that is, the control signal which is output to the electric motor 11b of the compressor 11, is determined as follows. First, based on the target vent temperature TAO, a control map which is stored in the control device in advance is referred to so as to determine the target evaporator temperature TEO of the inside evaporator 20. Further, the difference of this target evaporator temperature TEO and the detection values of the evaporator temperature sensors Tefin and Te is used as the basis to determine the control signal which is output to the electric motor 11b of the compressor 11 so that the temperature of the air which passes through the inside evaporator 20 approaches the target vent temperature TAO using a feedback control technique. Further, regarding the control signal which is output to the second expansion valve constituted by the inlet flow control valve 19a, the opening degree of the second expansion valve constituted by the inlet flow control valve 19a is determined so that the degree of subcooling of the refrigerant which flows into the inlet flow control valve 19a approaches a target degree of subcooling which is determined in advance so as to make the COP (coefficient of performance) approach the maximum value. The inlet flow control valve 19a and the outlet flow regulating valve 19b are made integral to form the flow control valve 19 of the first embodiment.

Regarding the control signal which is output to the servo motor of the air mix door 36, this is determined so that the air mix door 36 closes the air passage 36 of the heater core 34 and inside condenser 12 and so that the total flow rate of the fan air after passing through the inside evaporator 20 passes through the cooling air bypass passage 35. Therefore, in the refrigeration cycle system 10 at the time of the cooling mode, the high pressure refrigerant which is discharged from the compressor 11 flows to the inside condenser 12. At this time, the air mix door 3 closes the air passage of the heater core 34 and inside condenser 12, so the refrigerant which flows to the inside of the inside condenser 12 flows out from the inside condenser 12 with almost no heat exchange with the passenger compartment fan air. The refrigerant which flows out from the inside condenser 12 flows through the first refrigerant passage 13 to the inside of the first expansion valve 14. At this time, the first expansion valve 14 makes the first refrigerant passage 13 the wide open state, so the refrigerant which flows out from the inside condenser 12 flows into the outside heat exchanger 15 without being reduced in pressure by the first expansion valve 14. Further, the refrigerant which flows into the outside heat exchanger 15 discharges heat to the outside air which is blown from the blower fan at the outside heat exchanger 15.

The refrigerant which flows out from the outside heat exchanger 15 flows through the third refrigerant passage 18 to the inlet flow control valve 19a which is arranged at the inlet side of the inside evaporator 20 and is reduced in pressure and expanded at the inlet flow control valve 19a until becoming a low pressure refrigerant. The low pressure refrigerant which is reduced in pressure at the inlet flow control valve 19a flows into the inside evaporator 20 where it absorbs heat from the passenger compartment fan air which is blown from the blower 2 so as to evaporate. Due to this, the passenger compartment fan air is cooled.

The refrigerant which flows out from the inside evaporator 20 flows into the outlet flow regulating valve 19b which is arranged at the outlet side of the inside evaporator 20. At this time, the outlet flow regulating valve 19b is large in amount of valve lift and close to the fully open state and is in a state of a large opening area, so refrigerant flows into the accumulator 21 where it is separated into gas and liquid without any pressure drop occurring. Further, the gas phase refrigerant which was separated at the accumulator 21 is sucked into the compressor 11 from the suction side where it is again compressed at the compressor 11. Note that, the liquid phase refrigerant which is separated at the accumulator 21 is accumulated inside of the accumulator as excess refrigerant which is not required for making use of the cooling capacity which the cycle demands.

As explained above, in the cooling mode, the refrigerant is reduced in pressure and expanded at the inlet flow control valve 19a. On the other hand, the mechanically connected outlet flow regulating valve 19b is large in amount of valve lift and close to the fully open state and is in a state of a large opening area, so no pressure drop occurs and there is no effect on the technique of feedback control of the electric compressor 11 on the target evaporator temperature TEO.

Heating Mode

Next, referring to FIG. 3, the heating mode will be explained. In the heating mode, the control device uses the first shutoff valve 17 to open the second refrigerant passage 16 and uses the second shutoff valve 23 to close the fourth refrigerant passage 22 (fully closed). Furthermore, it uses the inlet flow control valve 19a of the second expansion valve 19 to close (fully close) the third refrigerant passage 18. Due to this, in the refrigeration cycle system 10, as shown by the arrows of FIG. 3, the refrigerant flow path through which the refrigerant flows is switched to. By this configuration of the refrigerant flow path, the control device uses the target vent temperature TAO, detection signals of the group of sensors, etc. as the basis to determine the operating states of the various control equipment which is connected to the control device (control signals which are output to the various control equipment). For example, the refrigerant discharge ability of the compressor 11, that is, the control signal which is output to the electric compressor, is determined in the following way. First, the target vent temperature TAO is used as the basis to refer to the control map which is stored in the control device in advance to determine the target condenser temperature TCO of the inside condenser 12.

Further, the difference between this target condenser temperature TCO and the detection value of the discharge temperature sensor is used as the basis to determine the control signal which is output to the electric compressor so that the temperature of the air which passes through the inside condenser 12 approaches the target vent temperature TAO using the feedback control technique. Further, regarding the control signal which is output to the first expansion valve 14, the cooling rate of the refrigerant which flows into the first expansion valve 14 is determined so as to approach a predetermined target subcooling degree so as to make the COP approach the maximum value. Regarding the control signal which is output to the servo motor of the air mix door 3, the signal is determined so that the air mix door 3 closes the cooling air bypass passage 35 and the entire flow of the fan air after passing through the inside evaporator 20 passes through the air passage 36 of the heater core 34 and inside condenser 12. Therefore, in the refrigeration cycle system 10 at the time of the heating mode, the high pressure refrigerant which is discharged from the compressor 11 flows into the inside condenser 12. The refrigerant which flows into the inside condenser 12 is blown from the blower 2 and exchanges heat with the passenger compartment fan air which passes through the condenser 12 so as to discharge heat. Due to this, the passenger compartment fan air is heated.

The refrigerant which flows out from the inside condenser 12 flows through the first refrigerant passage 13 to the first expansion valve 14 and is reduced in pressure and expands at the first expansion valve 14 until becoming a low pressure refrigerant. Further, the low pressure refrigerant which is reduced in pressure at the first expansion valve 14 flows into the outside heat exchanger 15 where it absorbs heat from the outside air which was blown from the blower fan. The refrigerant which flows out from the outside heat exchanger 15 flows through the second refrigerant passage 16 into the accumulator 21 where it is separated into a gas and liquid. Further, the gas phase refrigerant which is separated at the accumulator 21 is sucked in from the suction side of the compressor 11 and is again compressed by the compressor 11. Note that, the liquid phase refrigerant which was separated by the accumulator 21 is accumulated inside of the accumulator as excess refrigerant which is not needed for making use of the cooling capacity which the cycle demands. Note that, the third refrigerant passage 18 is closed by the inlet flow control valve 19a, so refrigerant does not flow into the inside evaporator 20.

As explained above, in the heating mode, the third refrigerant passage 18 is closed by the inlet flow control valve 19a. On the other hand, the outlet flow regulating valve 19b of the mechanically connected second expansion valve becomes an open state with a large opening area, so the inside evaporator 20 and the accumulator 21 are constantly fixed to a communicated state.

First Dehumidifying Heating Mode—Serial Dehumidifying

Figure 4:
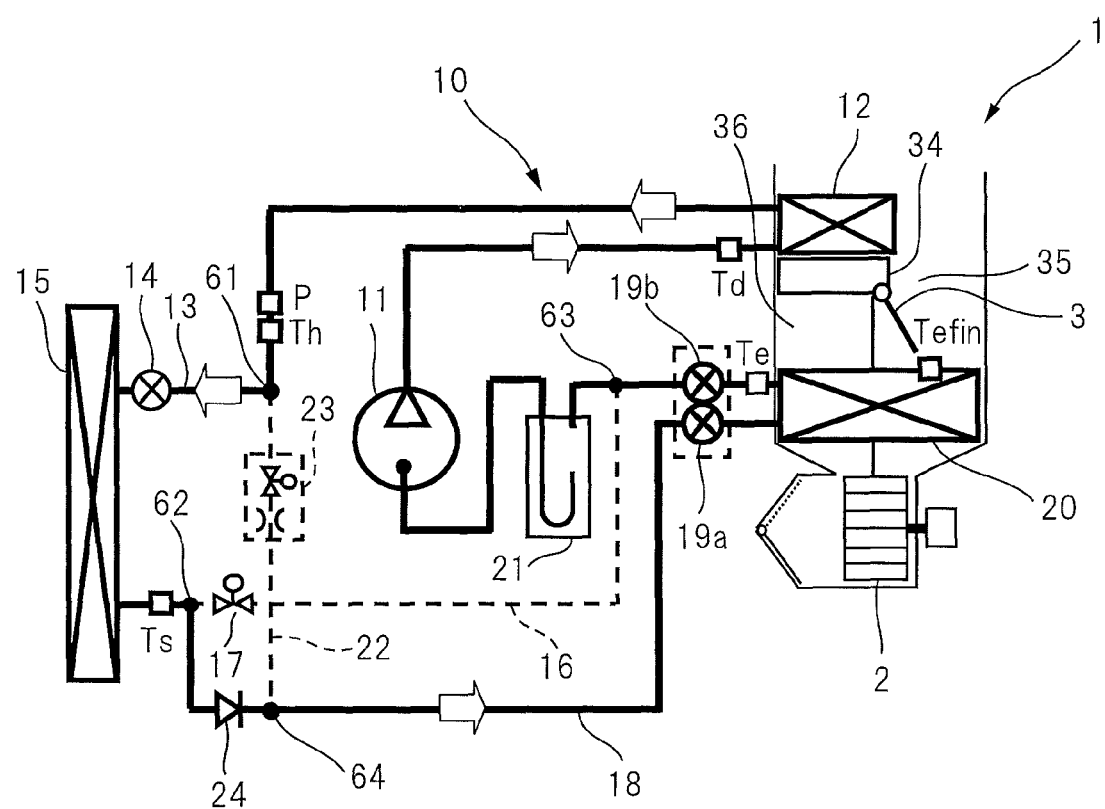
FIG. 4 is a view explaining the operation of a refrigeration cycle in a first dehumidifying heating mode of a second embodiment of the present invention.
Figure 5:
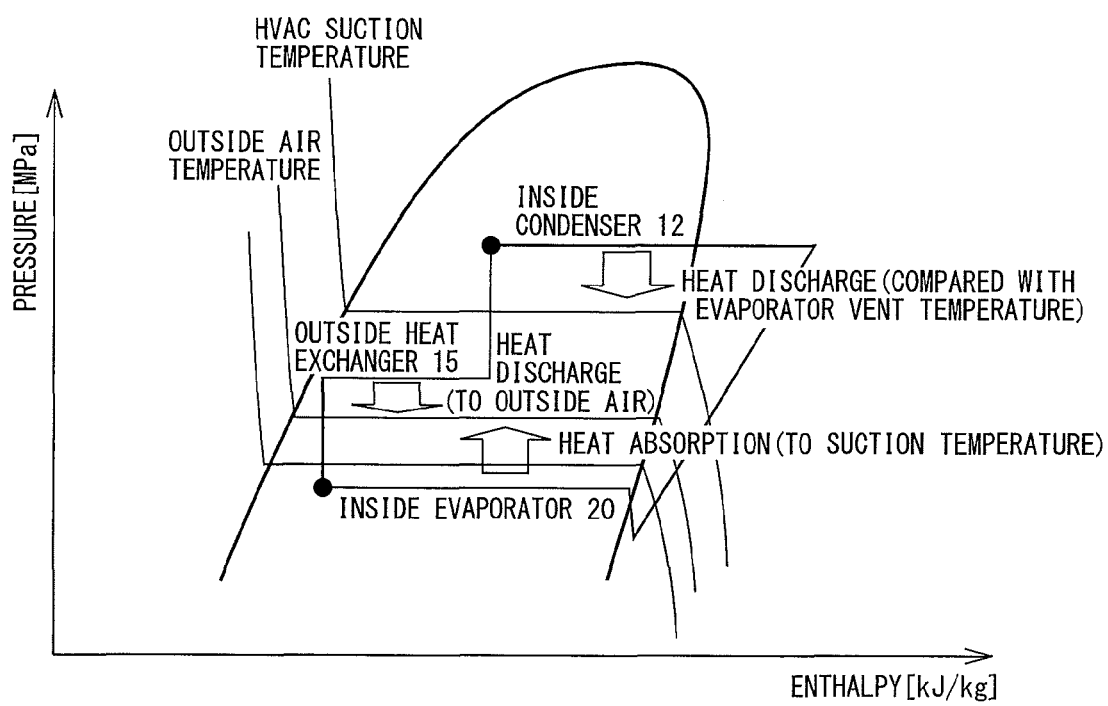
FIG. 5 is a view explaining the operation on a Mollier chart of a refrigeration cycle in a first dehumidifying heating mode of a second embodiment of the present invention.
Figure 5:
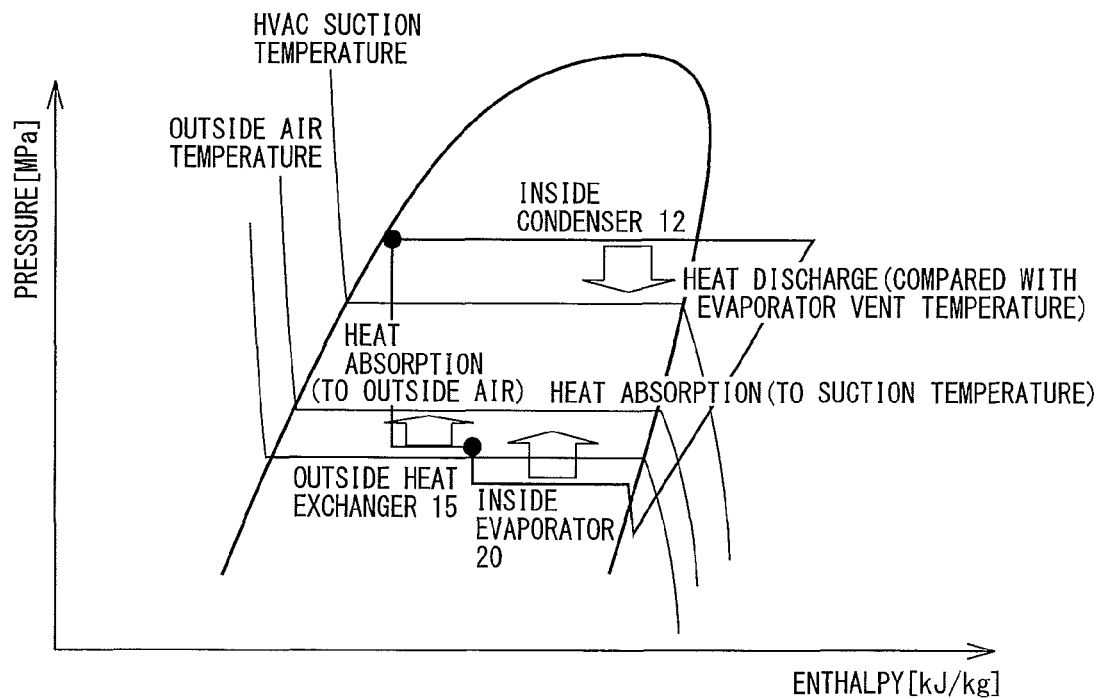

Next, referring to FIGS. 4 and 5, a first dehumidifying heating mode will be explained. In the first dehumidifying heating mode, the control device uses the first shutoff valve 17 to close the second refrigerant passage 16 and uses the second shutoff valve 23 to close the fourth refrigerant passage 22. Further, the first expansion valve 14 and the inlet flow control valve 19a are made the throttled state or fully open state. Due to this, the refrigeration cycle system 10, in the same way as the cooling mode, as shown by the arrows of FIG. 4, is switched to the refrigerant flow path through which the refrigerant flows. Note that, in the first dehumidifying heating mode, the outside heat exchanger 15 and the inside evaporator 20 are connected in series with respect to the refrigerant. Due to this configuration of the refrigerant flow path, the control device uses the target vent temperature TAO, detection signals of the group of sensors, etc. as the basis to determine the operating states of the various control equipment which are connected to the control device (control signals which are output to the various control equipment). For example, the control signal which is output to the servo motor of the air mix door 3 is determined so that the air mix door 3 closes the cooling air bypass passage 35 and the entire flow of the fan air which passes through the inside evaporator 20 passes through the air passage 36 of the heater core 34 and inside condenser 12, or the air mix door 3 is set to a suitable opening position. Further, the first expansion valve 14 and inlet flow control valve 19a are changed in opening in accordance with the target temperature of the vent air which is vented to the passenger compartment, that is, the target vent temperature TAO.

Specifically, along with a rise in the target temperature of the vent air which is vented into the passenger compartment, that is, the target vent temperature TAO, the control device uses the first expansion valve 14 to reduce the pressure of the outside heat exchanger 15 from the high pressure of the outlet of the inside condenser 12 to a predetermined intermediate pressure. The inlet flow control valve 19a reduces the pressure of and expands the refrigerant from the intermediate pressure to the low pressure refrigerant. As shown in FIG. 5, the intermediate pressure which is reduced to by the first expansion valve 14 is set to a pressure which gives a refrigerant temperature higher than the outside air temperature when the outside heat exchanger 15 discharges heat and is set to a pressure which gives a refrigerant temperature lower than the outside air temperature when it absorbs heat. The inlet flow control valve 19a adjusts the pressure which is reduced from the intermediate pressure of the first expansion valve 14 so that the pressure of the outlet of the inside condenser 12 becomes the target vent temperature TAO.

The high pressure refrigerant which is discharged from the compressor 11 flows into the inside condenser 12 where it exchanges heat with the passenger compartment fan air which was cooled by the inside evaporator 20 and dehumidified and discharges heat. Due to this, the passenger compartment fan air is heated. The refrigerant which flows out from the inside condenser 12 flows through the first refrigerant passage 13 to the first expansion valve 14. At this time, the first expansion valve 14 reduces the pressure of the refrigerant to a predetermined pressure, then the refrigerant which flows into the outside heat exchanger 15 exchanges heat with the outside air which is blown from the blower fan by the outside heat exchanger 15. The refrigerant which flows out from the outside heat exchanger 15 flows through the third refrigerant passage 18 into the inlet flow control valve 19a and is reduced in pressure and expanded at the inlet flow control valve 19a until becoming a low pressure refrigerant. The low pressure refrigerant which is reduced in pressure by the inlet flow control valve 19a flows into the inside evaporator 20 where it absorbs heat from the passenger compartment fan air which was blown from the blower 2 and evaporates. Due to this, the passenger compartment fan air is cooled.

Further, the refrigerant which flows out from the inside evaporator 20 flows into the outlet flow regulating valve 19b which is arranged at the outlet side of the inside evaporator 20. At this time, the outlet flow regulating valve 19b is large in amount of valve lift and close to the fully open state and is in a state of a large opening area, so refrigerant flows from the accumulator 21 to the suction side of the compressor 11 where it is again compressed by the compressor 11 without any pressure drop occurring. In the above way, even in the first dehumidifying heating mode, the inlet flow control valve 19a is used to reduce the pressure for expansion. On the other hand, the outlet flow regulating valve 19b which is mechanically connected with the inlet flow control valve 19a is large in amount valve lift and close to the fully open state and is in a state of a large opening area, so no pressure drop occurs and there is no effect on the feedback control technique of the electric compressor 11 for the target evaporator temperature TEO.

Second Dehumidifying Heating Mode—Parallel Dehumidifying

Figure 6:
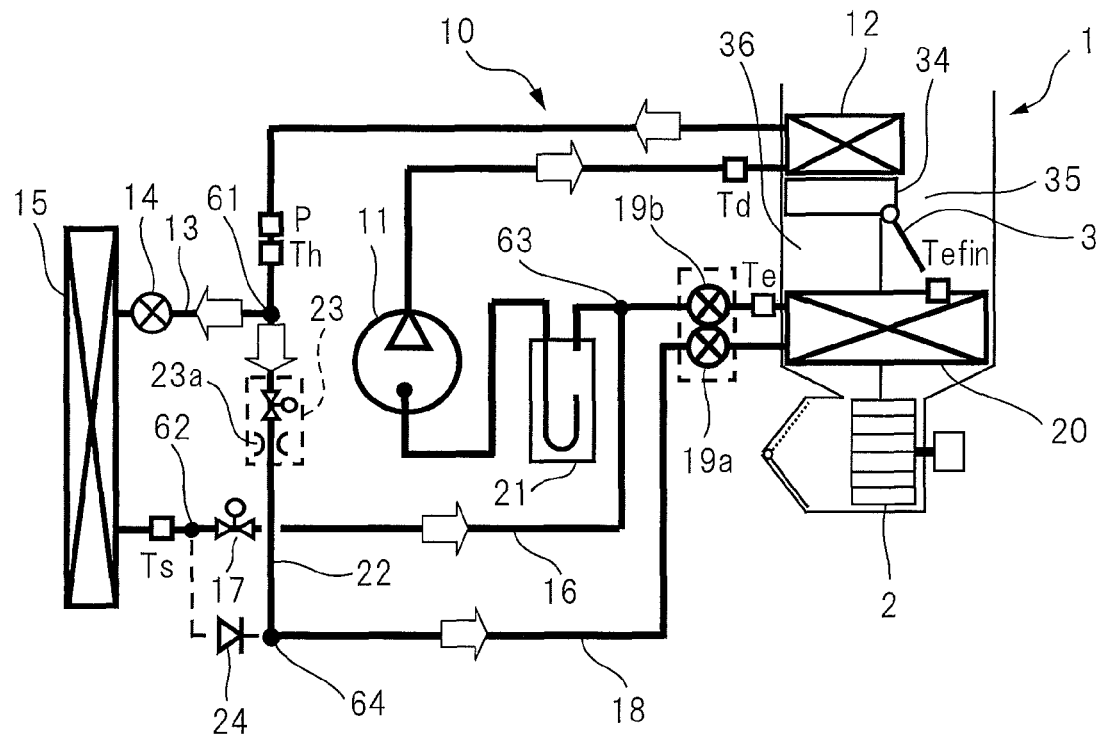
FIG. 6 is a view explaining the operation of a refrigeration cycle in a second dehumidifying heating mode of a second embodiment of the present invention.

Next, referring to FIG. 6, a second dehumidifying heating mode will be explained. Up to now, the outlet flow regulating valve 19b was made a fully open state, but in this mode, it functions as an evaporation pressure regulator (EPR) which is electrically controlled by a single control motor for preventing frost. In the second dehumidifying heating mode, the control device uses the first shutoff valve 17 to open the second refrigerant passage 16 and uses the second shutoff valve 23 to open the fourth refrigerant passage 22. The second shutoff valve 23 houses a fixed venturi part 23a inside of it and reduces the pressure of and expands the refrigerant. Further, both the first expansion valve 14 and the outlet flow regulating valve 19b are made the throttled state. Therefore, the refrigeration cycle system 10, as shown by the arrows of FIG. 6, is switched to a refrigerant flow path through which a refrigerant flows. Note that, in the second dehumidifying heating mode, the outside heat exchanger 15 (main refrigerant circuit) and inside evaporator 20 (bypass refrigerant circuit) are connected in parallel with respect to the flow of refrigerant.

Due to this configuration of the refrigerant flow path, the control device uses the target vent temperature TAO, detection signals of the group of sensors, etc. as the basis to determine the operating state of the various control equipment which are connected to the control device (control signals which are output to various control equipment). For example, the control signal which is output to the servo motor of the air mix door 3 is determined so that the air mix door 3 closes the cold air bypass passage 35 and the total flow rate of the fan air after passing through the inside evaporator 20 passes through the air passage 36 of the heater core 34 and inside condenser 12. The air mix door 3 is sometimes set to a suitable opening degree position. Further, the control signal which is output to the first expansion valve 14 is determined so as to give a predetermined opening for a second dehumidifying heating mode.

On the other hand, regarding the control signal which is output to the outlet flow regulating valve 19b, the opening of the outlet flow regulating valve 19b is determined so that the refrigerant evaporation pressure of the inside evaporator 20 becomes a predetermined target pressure where no frost is formed. Therefore, in the refrigeration cycle system 10 at the time of the second dehumidifying heating mode, the high pressure refrigerant which is discharged from the compressor 11 flows into the inside condenser 12, is cooled by the inside evaporator 20, exchanges heat with the dehumidified passenger compartment fan air, and discharges heat. Due to this, the passenger compartment fan air is heated.

The refrigerant which flows out from the inside condenser 12 flows through the first refrigerant passage 13 to the first expansion valve 14 and flows from the second shutoff valve 23 (fixed venturi part 23a) through the fourth refrigerant passage 22 to the inlet flow control valve 19a (state of large opening area) and the outlet flow regulating valve 19b (frost preventing control opening degree). The high pressure refrigerant which flows into the first expansion valve 14 is reduced in pressure until becoming a low pressure refrigerant of a lower temperature than the outside air temperature. Further, the low pressure refrigerant, which was reduced in pressure at the first expansion valve 14, flows into the outside heat exchanger 15 and absorbs heat from the outside air which is blown in from the blower fan.

On the other hand, the low pressure refrigerant which flows into the inlet flow control valve 19a passes through the inlet flow control valve 19a in a state with a large amount valve lift, close to the fully open state, and with a large opening area to flow into the inside evaporator 20 where it absorbs heat from the passenger compartment fan air which is blown in from the blower 2 and evaporates, whereby the passenger compartment fan air is cooled. The refrigerant which flows out from the inside evaporator 20 is reduced in pressure by the outlet flow regulating valve 19b which is arranged at the outlet side of the inside evaporator 20 from the predetermined evaporation pressure and flows into the accumulator 21.

Figure 7:
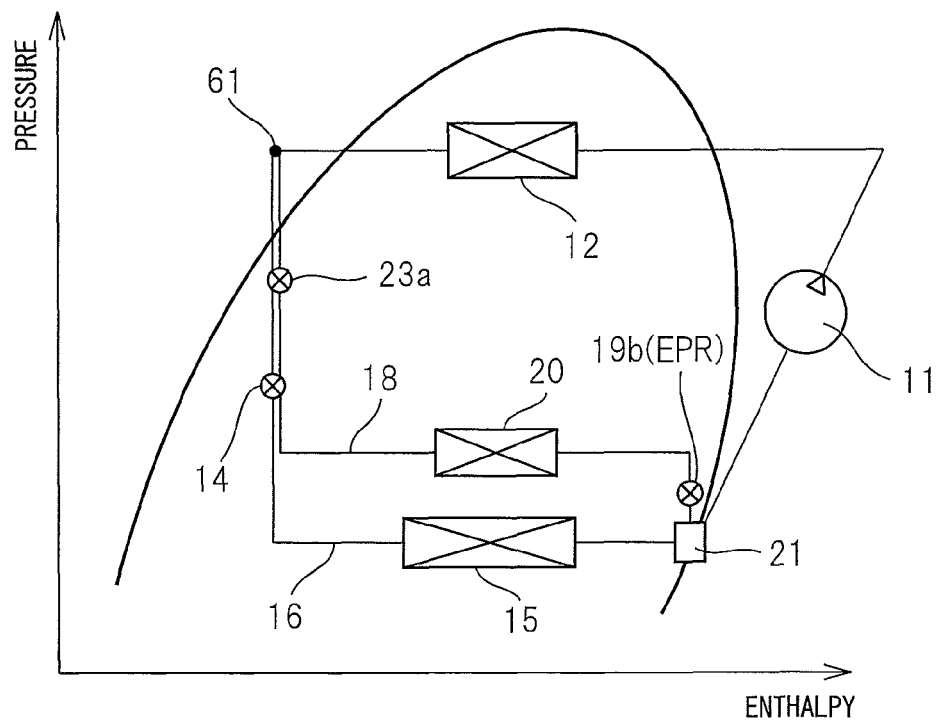
FIG. 7 is a Mollier chart of a refrigeration cycle in a second dehumidifying heating mode of a second embodiment of the present invention.

The refrigerant which flows out from the outside heat exchanger 15 and the refrigerant which flows out from the inside evaporator 20 flow from the accumulator 21 to the suction side of the compressor 11 and again are compressed at the compressor 11. The Mollier chart of the second dehumidifying heating mode is shown in FIG. 7. The outlet flow regulating valve 19b uses the evaporation pressure regulator (EPR) for frost prevention to maintain the evaporation pressure of the refrigerant in the evaporator at a constant pressure (set pressure). The valve element 301 of the outlet flow regulating valve 19b is driven by a motor (step motor) 500 to any position in the up-down direction of FIG. 1A. For this reason, the problems (1) to (6) explained in the background art for the prior art spring type evaporation pressure regulator are solved.

In the second dehumidifying heating mode of the present embodiment, the pressure of the low pressure refrigerant which flows out from the outside heat exchanger 15 and the pressure of the low pressure refrigerant which flows out from the outlet flow regulating valve 19b become a pressure equal to the accumulator 21. Even if the outlet flow regulating valve 19b is set fully open to try to adjust the flow rate by the inlet flow control valve 19a, the pressure of the inside evaporator 20 ends up being pulled along by the pressure of the accumulator 21, so the outlet flow regulating valve 19b has to be used for flow rate control. Further, the third refrigerant passage 18 is provided with a check valve 24, so refrigerant will not flow back from the fourth refrigerant passage 22 to the outlet side of the low pressure outside heat exchanger 15. Note that, the second shutoff valve 23 may intermittently open and close to adjust the refrigerant flow rate when the amount of heat absorbed at the inside evaporator 20 is small.

As explained above, at the time of the second dehumidifying heating mode, different from the time of the first dehumidifying heating mode, the refrigerant flow path becomes one where the outside heat exchanger 15 and the inside evaporator 20 are connected in parallel to the flow of refrigerant, but even when the outlet refrigerant pressure of the outside heat exchanger 15 is lower than the refrigerant evaporation pressure of the inside evaporator 20, it is possible to use the outlet flow regulating valve 19b to maintain the evaporation pressure of the inside evaporator 20 at a target pressure where no frost occurs without using additionally an EPR or other parts. Furthermore, it is possible to flexibly change the target pressure in accordance with the input values of the group of various sensors or fan volume, so it is possible to prevent the vent temperature or air flow from becoming more excessive than necessary.

Regarding the control signal which is output to the first expansion valve 14, the outlet side of the outside heat exchanger outlet may be provided with a temperature sensor Ts, and the target superheating degree and superheating degree at the outside heat exchanger outlet side (difference from detected value of temperature sensor Ts etc.) may be used as the basis to determine the control signal which is output to the first expansion valve 14 so that the superheating degree at the outlet side of the outside heat exchanger 15 approaches the target superheating degree using a feedback control technique etc.

At the time of the second dehumidifying heating mode, the outlet flow regulating valve 19b is used for frost control of the inside evaporator 20. On the other hand, at the time of the cooling mode or first dehumidifying heating mode, the inlet flow regulating valve 19a is set to the control opening degree and the outlet flow regulating valve 19b is at the fully open state, so in these modes, it is sufficient to perform frost control of the inside evaporator 20 by the amount of compressor discharge refrigerant (compressor speed and capacity).

Figure 8:
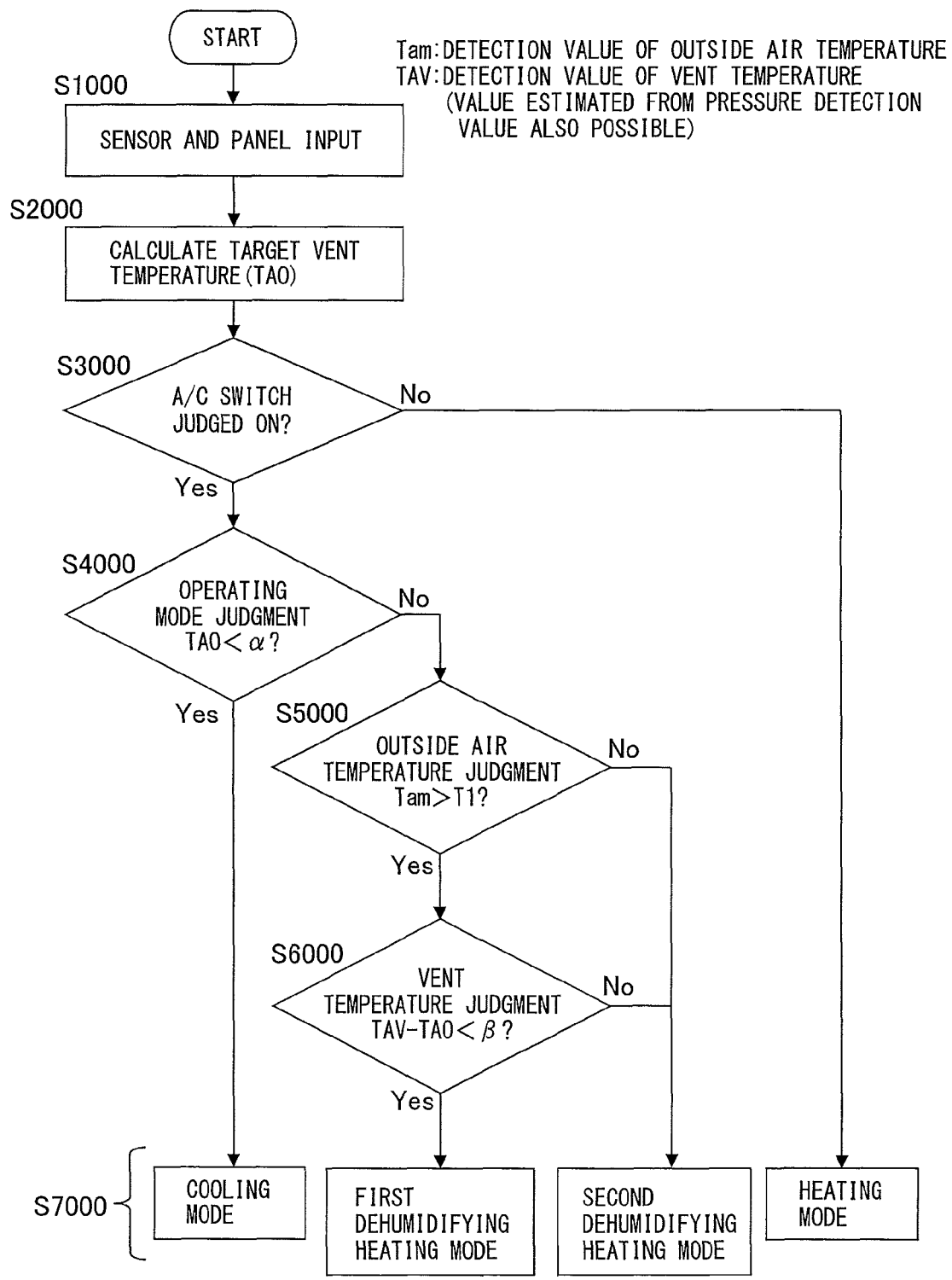
FIG. 8 is a flow chart of control at different modes of a second embodiment of the present invention.

Next, the switching control of these modes will be explained with reference to the control flow chart of FIG. 8. At step S1000, the different sensor outputs and panel output are input. To calculate the target vent temperature TAO, the outside air temperature Tam, inside air temperature, amount of sunlight, and set temperature are the general input items. At step S2000, the input values at step S1000 are used as the basis to calculate TAO. At step S3000, the ON or OFF state of the A/C switch is judged. Here, the A/C switch, in the same way as current car air-conditioners, is defined as a switch which turns the function of cooling (or dehumidifying) the inside evaporator 20 ON and OFF. When the A/C switch is OFF, the heating mode is shifted to. When the A/C switch is ON, the next step S4000 is shifted to.

At step S4000, if TAO is smaller than the set value $\alpha$, the cooling mode is shifted to. When it is higher than $\alpha$, the dehumidifying mode is judged and the next step S5000 is shifted to. At step S5000, if the outside air temperature Tam is low (for example T1 or less), the operation shifts to a second dehumidifying mode where a high vent temperature is obtained even in the low temperature region. When higher than T1, the routine proceeds to the next step S6000. At the step S6000, when setting and running an operation mode, the detection value TAV of the vent temperature (passenger compartment vent air temperature) and the target vent temperature TAO are compared. When a predetermined value β or less, the system is operated as is in the first dehumidifying heating mode. When a discrepancy of a predetermined value or more occurs, the system shifts to a second dehumidifying heating mode where a higher vent temperature is obtained.

The mode where there are flows of refrigerant at the inside condenser 12 and the inside evaporator 20 and heat is exchanged between them is a dehumidifying heating mode. The difference between the first dehumidifying heating mode and the second dehumidifying heating mode is the flow of refrigerant of the outside heat exchanger 15. In the case of the first dehumidifying heating mode, the outside heat exchanger 15 becomes serial in flow with the inside evaporator 20. In the case of the second dehumidifying heating mode, the outside heat exchanger 15 becomes parallel in flow with the inside evaporator 20. The first dehumidifying heating mode and the second dehumidifying heating mode, as shown in FIG. 8, are selectively used in accordance with the target vent temperature TAO, the outside air temperature Tam, etc.

Next, a flow regulating valve 19 of another embodiment will be explained. (Points of differences from the first embodiment or prior embodiments will be explained. In addition, points which are similar to the first embodiment or prior embodiments will be omitted.)

Figure 9:
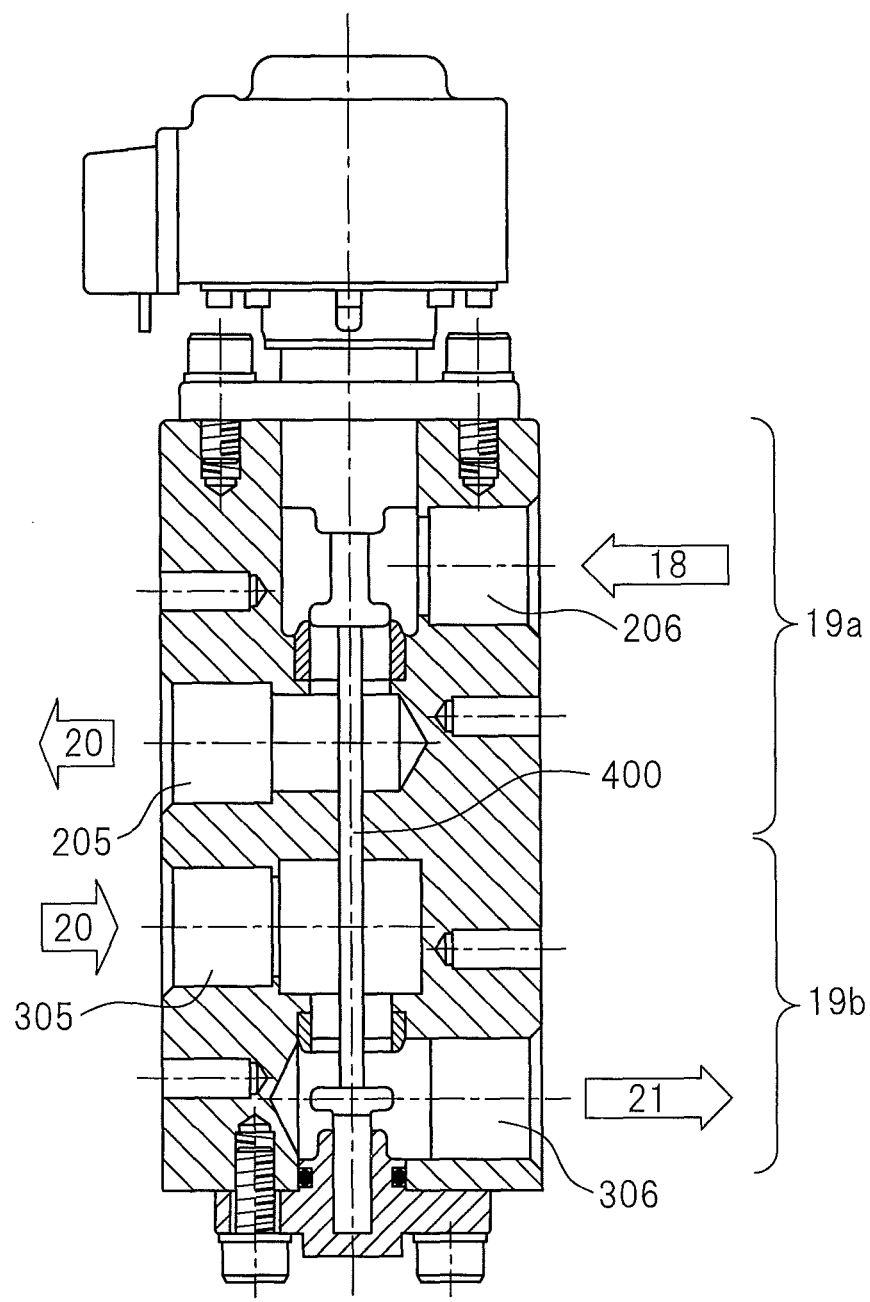
FIG. 9 is a cross-sectional view of a flow regulating valve of a third embodiment of the present invention (when inlet flow control valve 19a is closed).

(Third Embodiment, FIG. 9)

In the case of the first embodiment, as seen in FIG. 1A, the connection hole 206 from the outside heat exchanger 15 and the connection hole 305 from the inside evaporator 20 are arranged adjoining each other. Compared with the connection hole 206 from the outside heat exchanger 15, the pressure of the connection hole 305 is low, so there is a pressure difference between the two. On the other hand, in the present embodiment, as seen in FIG. 9, the connection hole 205 to the inside heat exchanger 20 and the connection hole 305 from the inside evaporator 20 are arranged adjoining each other. The pressure loss inside the inside evaporator 20 is small, so the difference between the inlet and outlet is small and the amount of leakage of the through part of the connecting shaft 400 is small, so the O-ring of the through part can be omitted. The rest is similar to the case of the first embodiment.

Figure 10A:
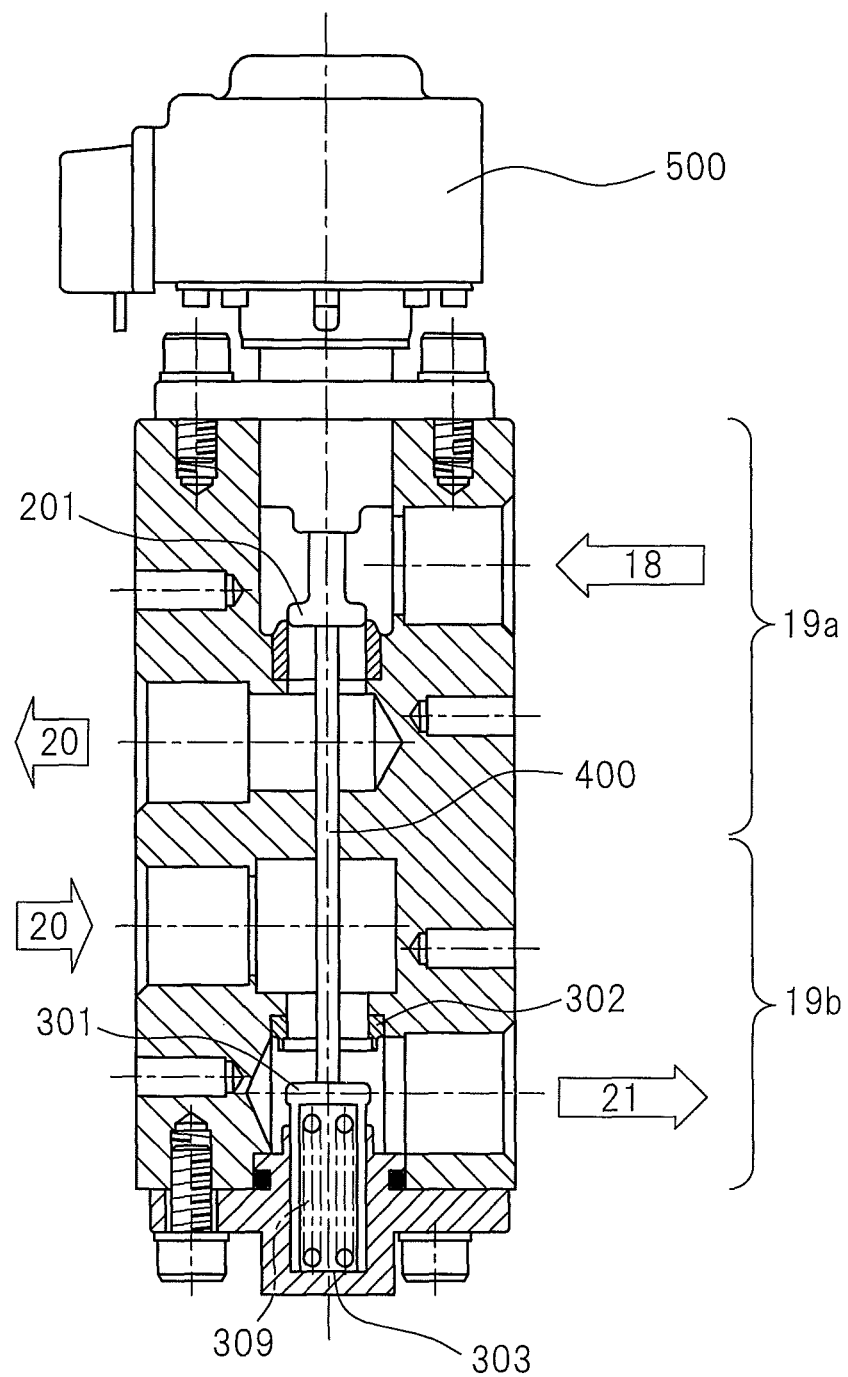
FIG. 10A is a cross-sectional view of a flow regulating valve of a fourth embodiment of the present invention (when inlet flow control valve 19a is closed).
Figure 10B:
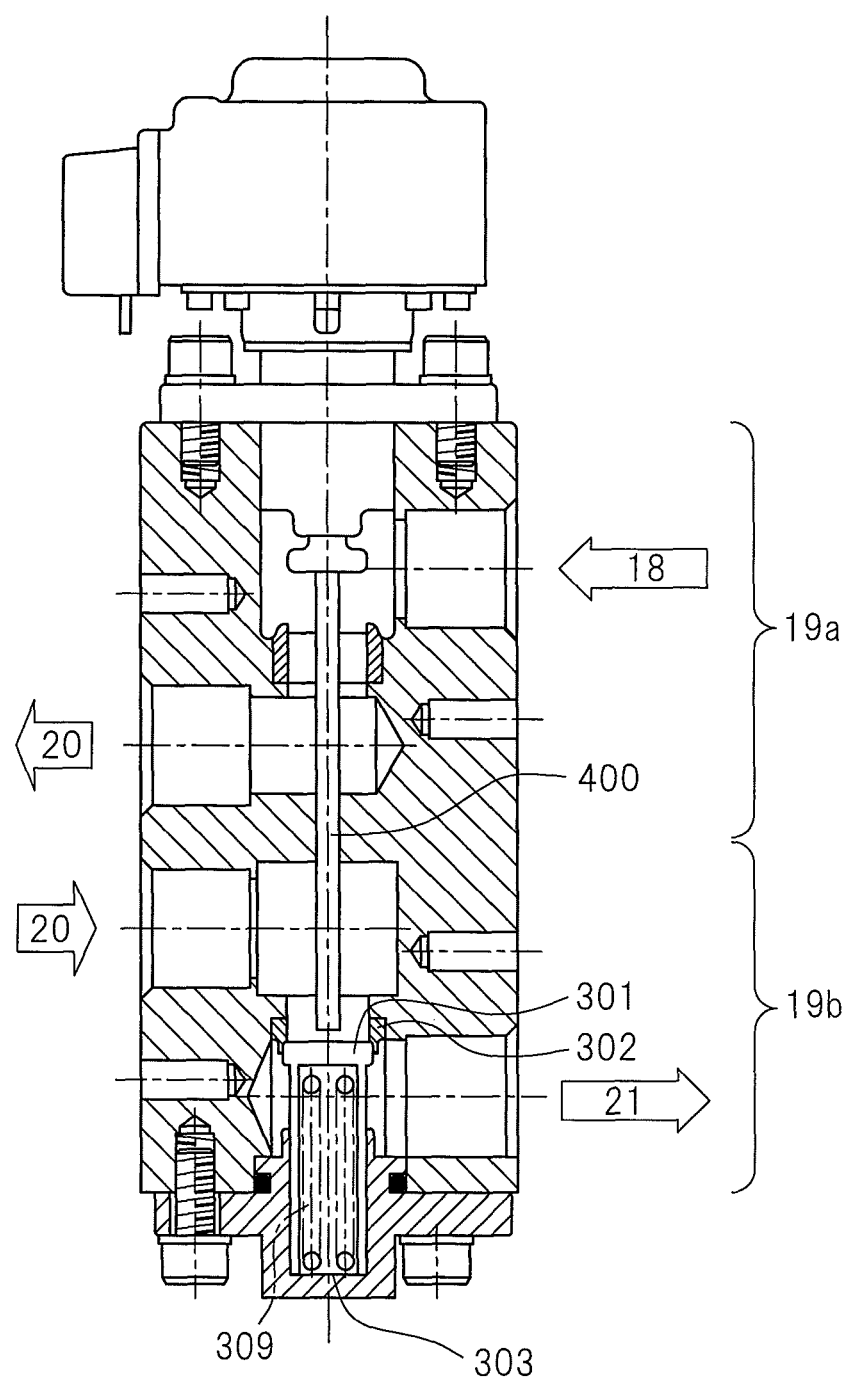
FIG. 10B is a cross-sectional view of a flow regulating valve of a fourth embodiment of the present invention (when outlet flow regulating valve 19b is closed).

(Fourth Embodiment, FIGS. 10A and 10B)

Compared with the third embodiment, the valve element 301 of the outlet flow regulating valve 19b is moved along a sliding hole which is provided at the valve receiver 303 in the valve lift direction. At the inside of the valve element 301, a spring 309 is housed. This pushes the valve element 301 in a direction contacting the valve seat 302. The rest is similar to the first and third embodiments. As shown in FIG. 10B, in the present embodiment, the valve element 301 and the connecting shaft 400 are not connected. If using the motor 500 to drive the valve element 201 in the closing direction, the connecting shaft 400 also descends. If the bottom end of the connecting shaft 400 contacts the valve element 301, the valve element 301 is made to move in the opening direction. If driving the valve element 201 in the opening direction, it moves in the closing direction by the spring 309 in accordance with the rise of the connecting shaft 400.

In the present embodiment, assembly work to connect the valve element 301 to the connecting shaft 400 is unnecessary, so assembly becomes easy. Further, when the valve element 301 approaches the valve seat 302 and closes the valve, the connecting shaft 400 separates from the valve element 301, so there is the advantage that an excessive load acts on the valve element 301.

Figure 11:
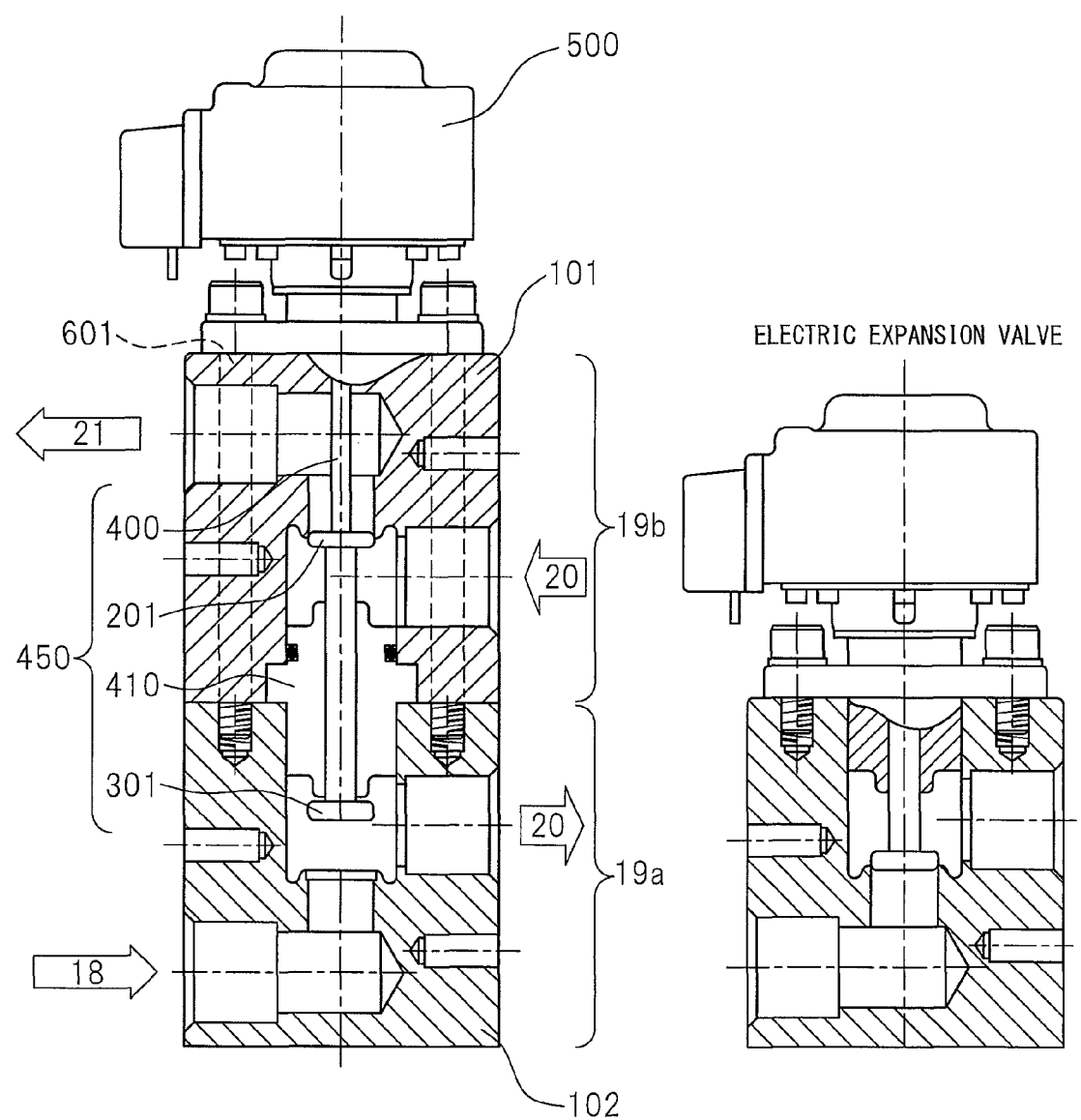
FIG. 11 is a cross-sectional view of a flow regulating valve of a fifth embodiment of the present invention (when inlet flow control valve 19a is closed).

(Fifth Embodiment, FIG. 11)

Compared with the first embodiment, the body part 100 is divided into a block 102 of an inlet flow control valve 19a and a block 101 of an outlet flow regulating valve 19b. Further, the connecting shaft 400 to which the valve elements 201 and 301 are attached is inserted into the shaft guide 410 to form a subassembly 450. In the present embodiment, the subassembly 450 is attached between the blocks 101 and 102. The connecting shaft 400 and motor are joined inside the motor 500. The motor 500 and the blocks 101 and 102 are assembled by connection by through bolts 601. In the present embodiment, the body side is also divided into the blocks 101 and 102, so body can be easily worked. Further, it is possible to use only the block 101 of the inlet flow control valve for use as an electric expansion valve, so the parts can be shared. Furthermore, the valve elements 201 and 301 form the subassembly 450, so the assembly work becomes simpler.

Figure 12A:
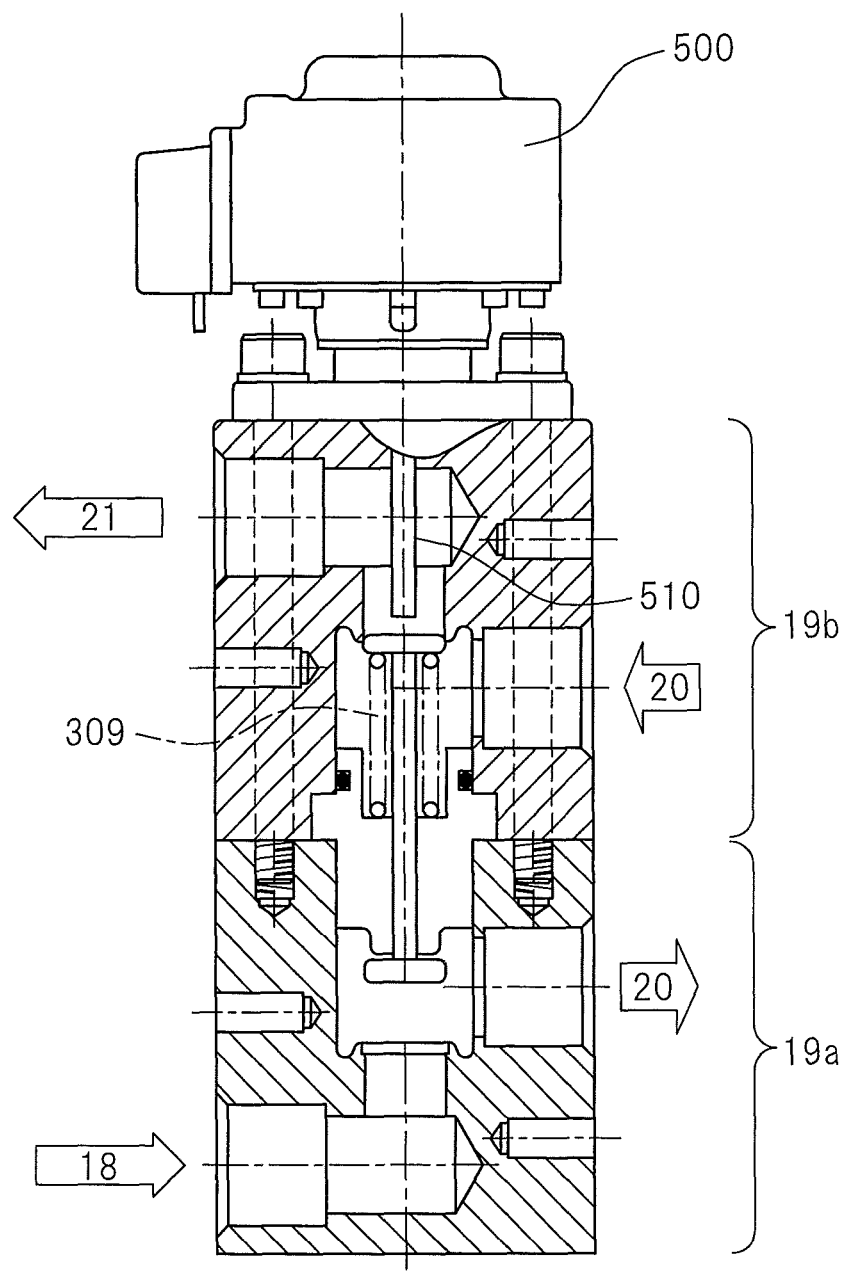
FIG. 12A is a cross-sectional view of a flow regulating valve of a sixth embodiment of the present invention (when inlet flow control valve 19a is closed).
Figure 12B:
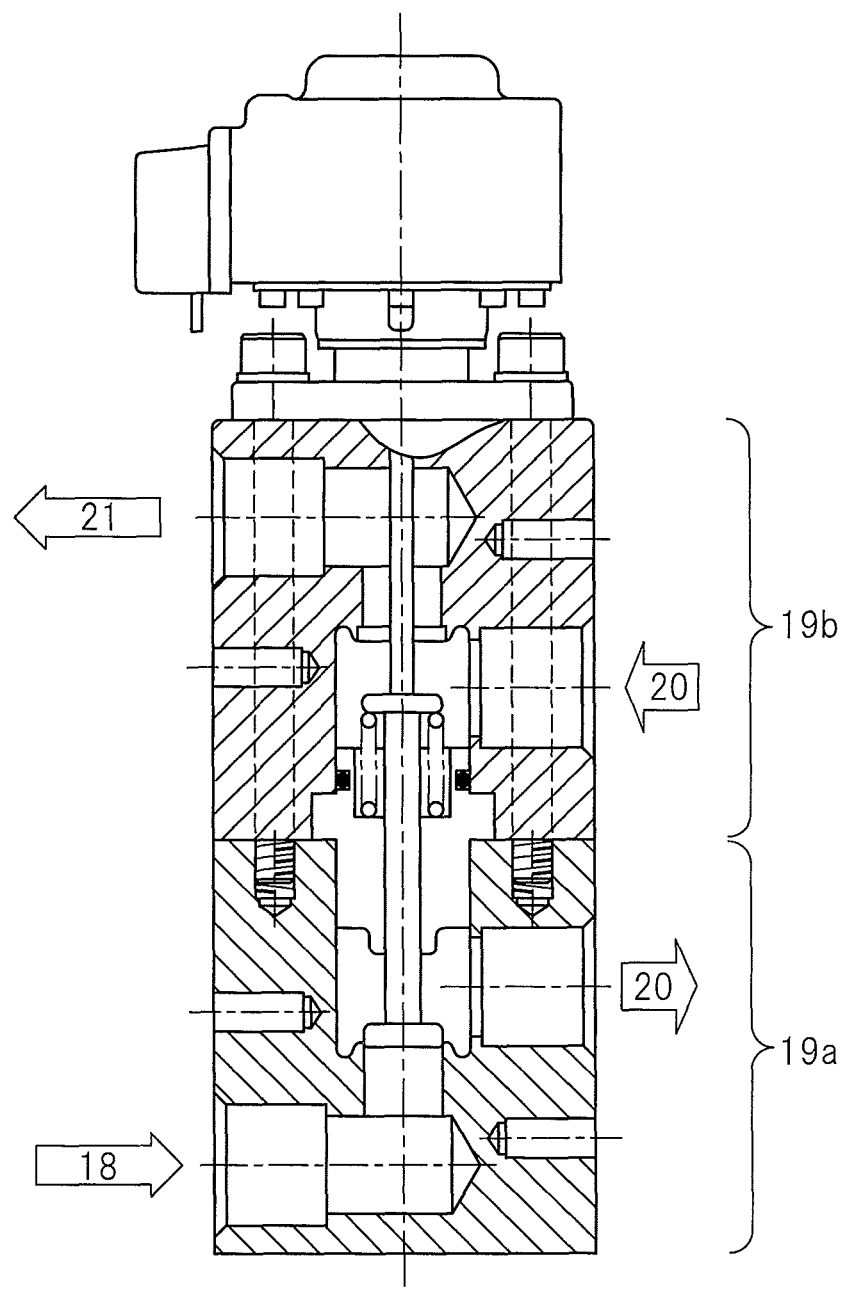
FIG. 12B is a cross-sectional view of a flow regulating valve of a sixth embodiment of the present invention (when outlet flow regulating valve 19b is closed).

(Sixth Embodiment, FIGS. 12A and 12B)

Compared with the fifth embodiment, in the same way as the fourth embodiment, a spring 309 is provided which biases the valve element 301 in the closing direction. In the present embodiment, at the time of assembly, there is no need to connect the motor and the connecting shaft 400, so further assembly becomes easy. Further, after closing, the pushrod 510 is separated, so there is the advantage that the valve element 301 is not acted on by an excess load in the same way as the fourth embodiment.

Figure 13B:
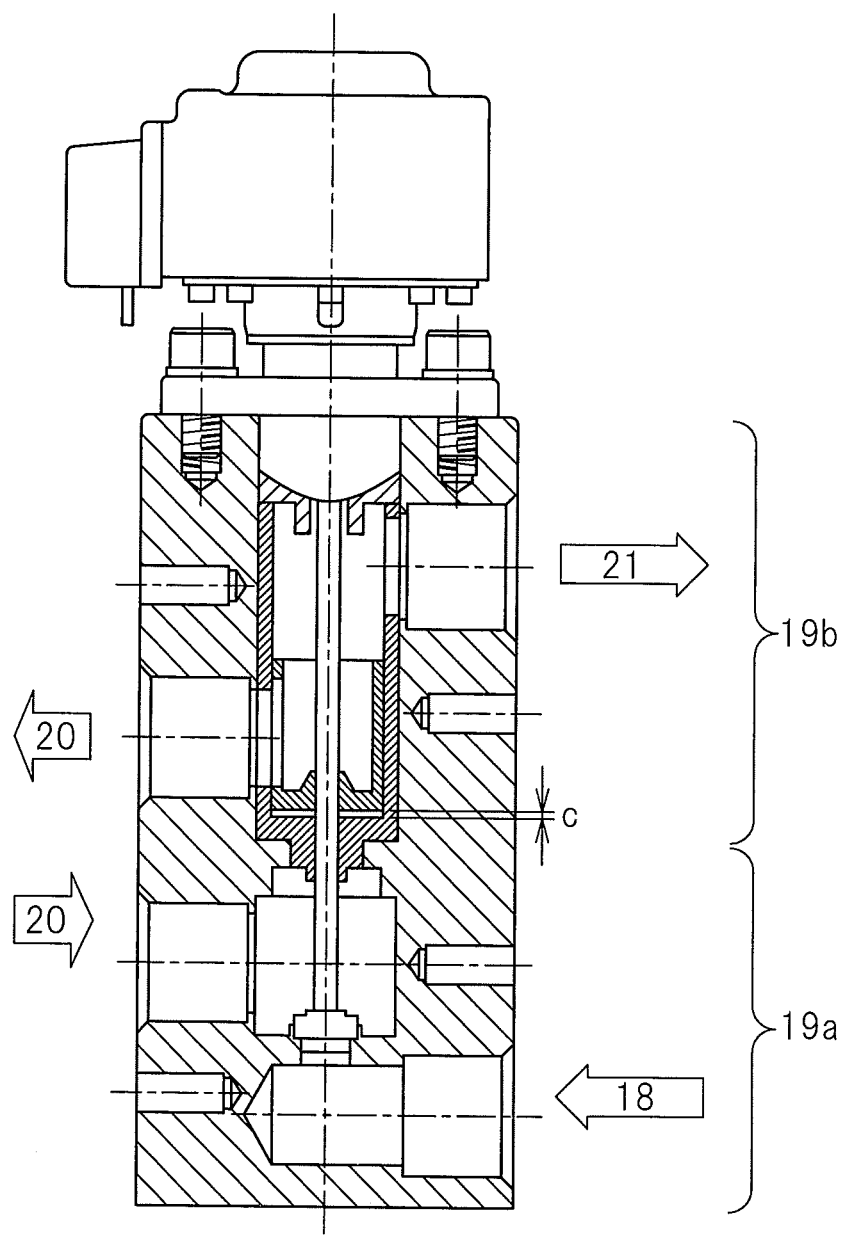
FIG. 13B is a cross-sectional view of a flow regulating valve of a seventh embodiment of the present invention (when outlet flow regulating valve 19b is closed).

(Seventh Embodiment, FIGS. 13A and 13B)

The seventh embodiment shows an embodiment which makes the outlet flow regulating valve 19b a slide valve structure. The piston 360 which is fastened to the connecting shaft 400 slides inside of the cylinder 350. The cylinder 350 is provided with an opening part 307 which communicates with the connecting hole 305 from the inside evaporator 20. The piston 360 is provided with an opening hole 308 of a shape which increases in opening area if the connecting shaft 400 descends (downward direction of FIG. 13B). That is, if the connecting shaft 400 descends, the outlet flow regulating valve 19b increases in the area of the opening part which is formed by the piston 360 and cylinder 350. On the other hand, the valve element 201 approaches the valve seat 202 whereby the valve opening decreases and reaches a closed state. When the connecting shaft 400 rises, the valve opening changes in the opposite way.

In the inside evaporator 20, the liquid refrigerant evaporates to form a gaseous refrigerant, so large volume gaseous refrigerant flows to the outlet flow regulating valve 19b. In the present embodiment, by employing a slide valve structure, it is possible to make the cylinder diameter larger than the pipe diameter and thereby secure the opening area of the valve. Further, the slide valve can reduce the drive force of the motor since the force due to the pressure difference upstream and downstream of the valve does not act in the valve lift direction. Furthermore, in the present embodiment, by making the cylinder 350 a structure to be inserted into the body, the valve element 201 can be inserted from the slide valve side. Assembly in one direction from the motor mounting hole becomes possible. Furthermore, if giving a margin to the closing position of the slide valve and the contact position of the cylinder 350 and the piston 360 (clearance "c" of FIG. 13B), there is no mechanical contact at the time of valve closing, so even large error in the stopping position of the motor can be allowed. The outlet flow regulating valve 19b may be provided with a bypass flow path (bleed port) which allows a predetermined flow rate even when closed.

Figure 14A:
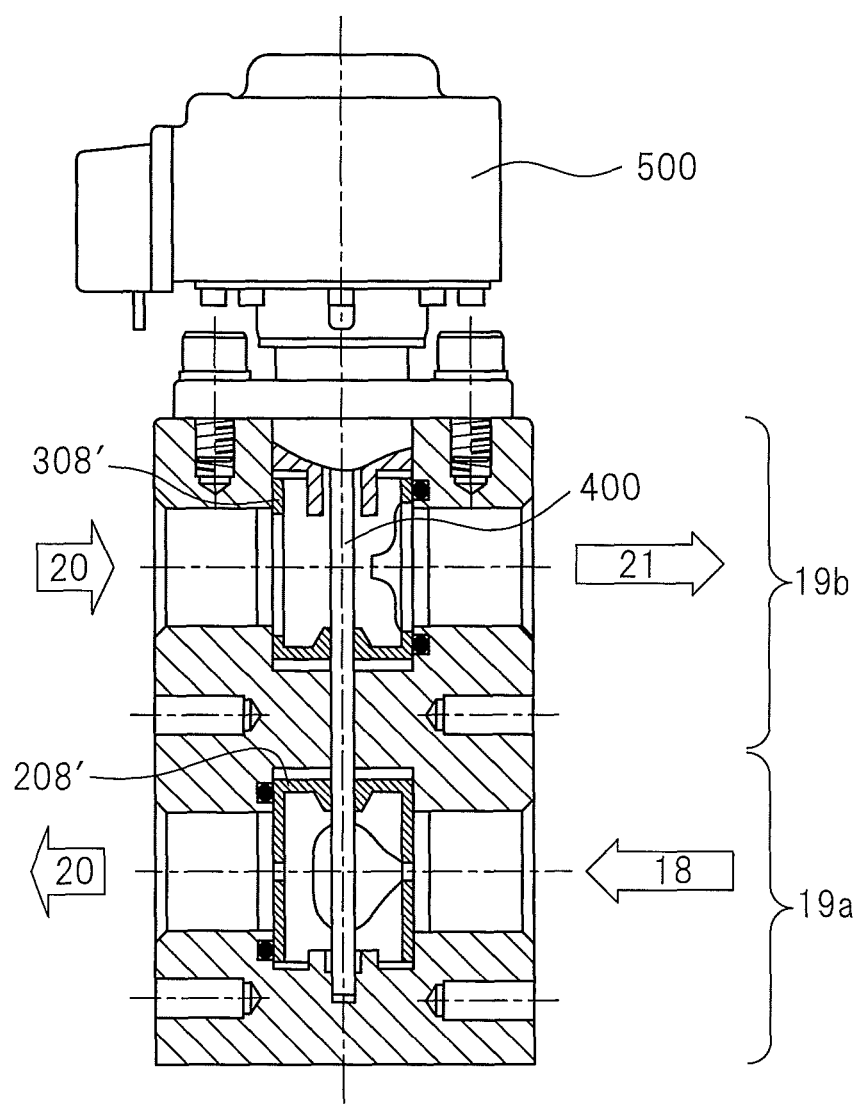
FIG. 14A is a cross-sectional view of a flow regulating valve of an eighth embodiment of the present invention (when inlet flow control valve 19a is closed).
Figure 14B:
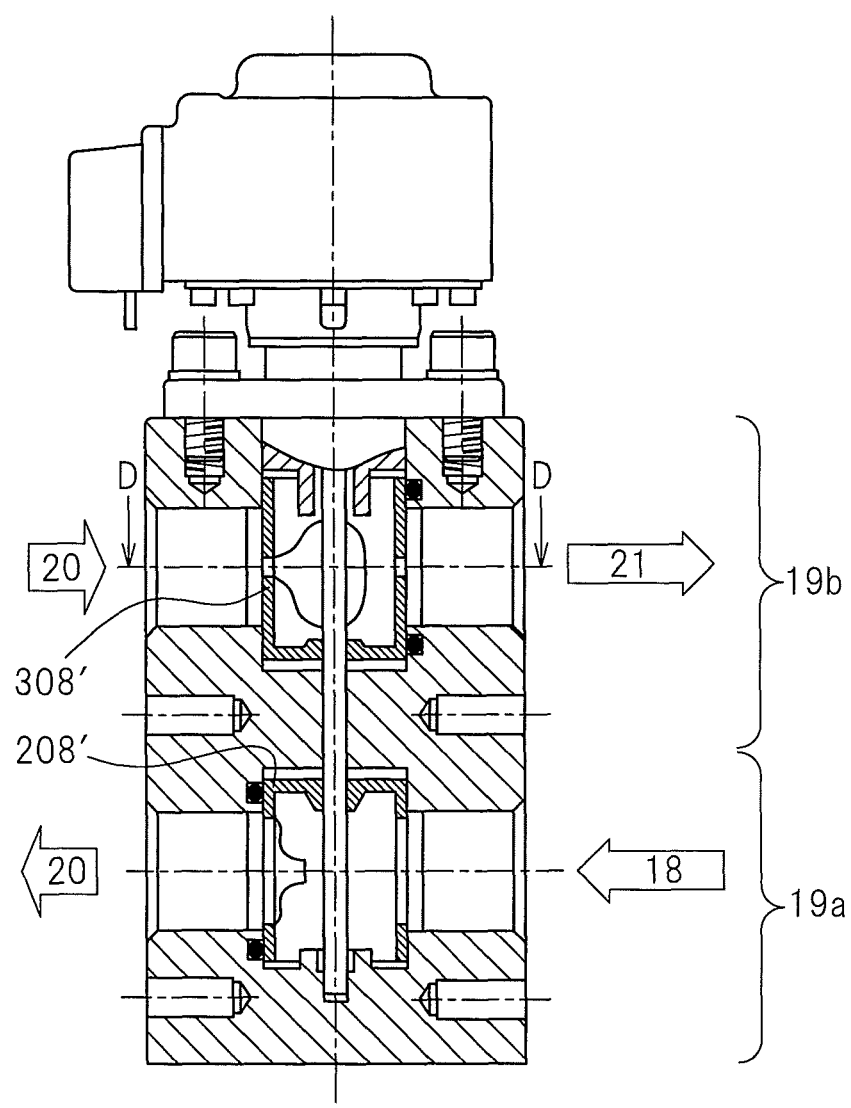
FIG. 14B is a cross-sectional view of a flow regulating valve of an eighth embodiment of the present invention (when outlet flow regulating valve 19b is closed).
Figure 14C:
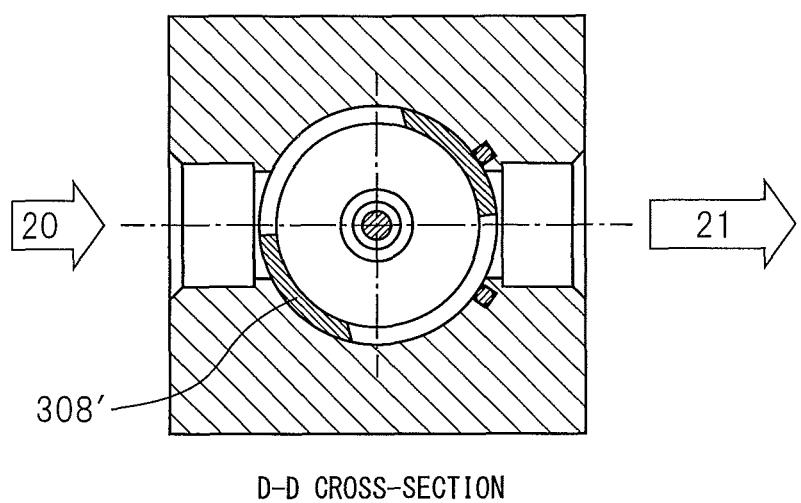
FIG. 14C is a cross-sectional view which relates to a line D-D of FIG. 14B.

(Eighth Embodiment, FIGS. 14A, 14B, and 14C)

The eighth embodiment shows an embodiment where the outlet flow regulating valve 19b and the inlet flow control valve 19a are comprised of rotary valves. In the present embodiment, the valve element 308' of the outlet flow regulating valve 19b and the valve element 208' of the inlet flow control valve 19a are made to rotate through the connecting shaft 400 by the motor 500. The opening parts of the valve element 308' and the valve element 208' are provided so that the changes in area become opposite with respect to rotation of the valve elements (see FIGS. 14B and 14C). According to the present embodiment, even if the outlet flow regulating valve 19b and the inlet flow control valve 19a are superposed, the total height can be made lower and mounting becomes easy. Further, rotational force of the control motor 500 does not have to be converted to linear motion, so the control motor can be simplified. Furthermore, in the same way as the slide valve, there is no mechanical contact at the time of valve closing, so even if the error in stopping position of the motor is large, this would be allowable.

Figure 15A:
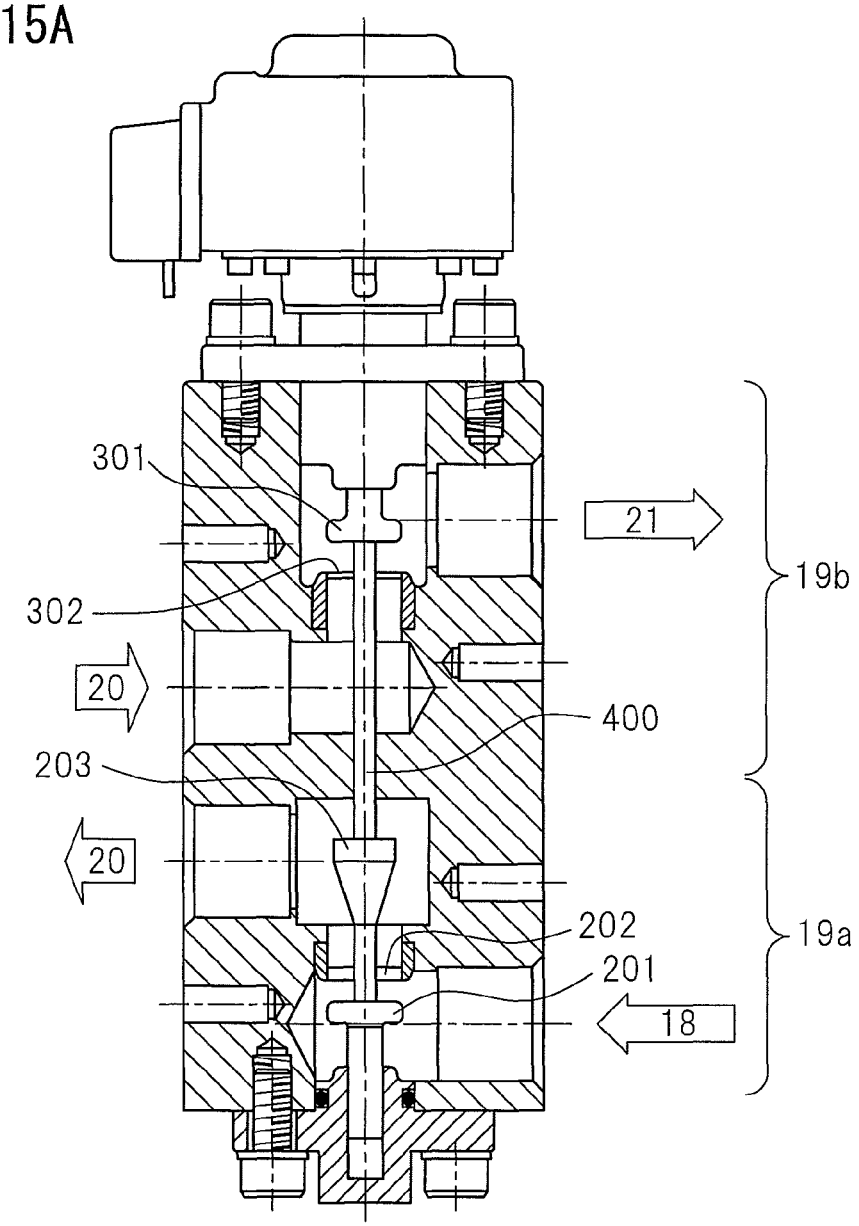
FIG. 15A is a cross-sectional view of a flow regulating valve of a ninth embodiment of the present invention (when outlet flow regulating valve 19b is intermediate opening).

(Ninth Embodiment, FIG. 15A)

Figure 15B:
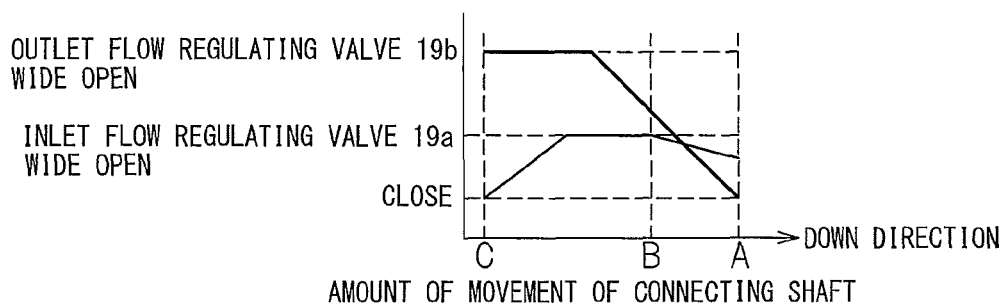
FIG. 15B shows a valve opening characteristic of a flow regulating valve of a ninth embodiment of the present invention.

The ninth embodiment adds to the inlet flow control valve 19a a sub valve 203 which reduces the opening area of the inlet flow control valve 19a if the valve element 201 is separated from the valve seat 202 by a predetermined amount or more. When using the outlet flow regulating valve 19b to adjust the evaporation pressure of the evaporator, if the refrigerant flow rate is small, the clearance between the valve element 301 and the valve seat 302 becomes excessively small and sometimes flow rate control becomes difficult. According to the present embodiment, due to the sub valve 203, by reducing the opening of the inlet flow control valve 19a, the characteristic as shown by the valve opening characteristic of FIG. 15B is obtained and flow rate control by the outlet flow regulating valve 19b becomes easy. At the valve opening characteristic of FIG. 15B, the position C is the case where the connecting shaft 400 is at its topmost position and the valve element 201 is seated on the valve seat 201. It is the valve opening characteristic when being made to move downward from C to B and A.

The flow regulating valve 19 of the present invention can be applied to not only the second embodiment, but also the next refrigeration cycle system.

(10th Embodiment)

Figure 16:
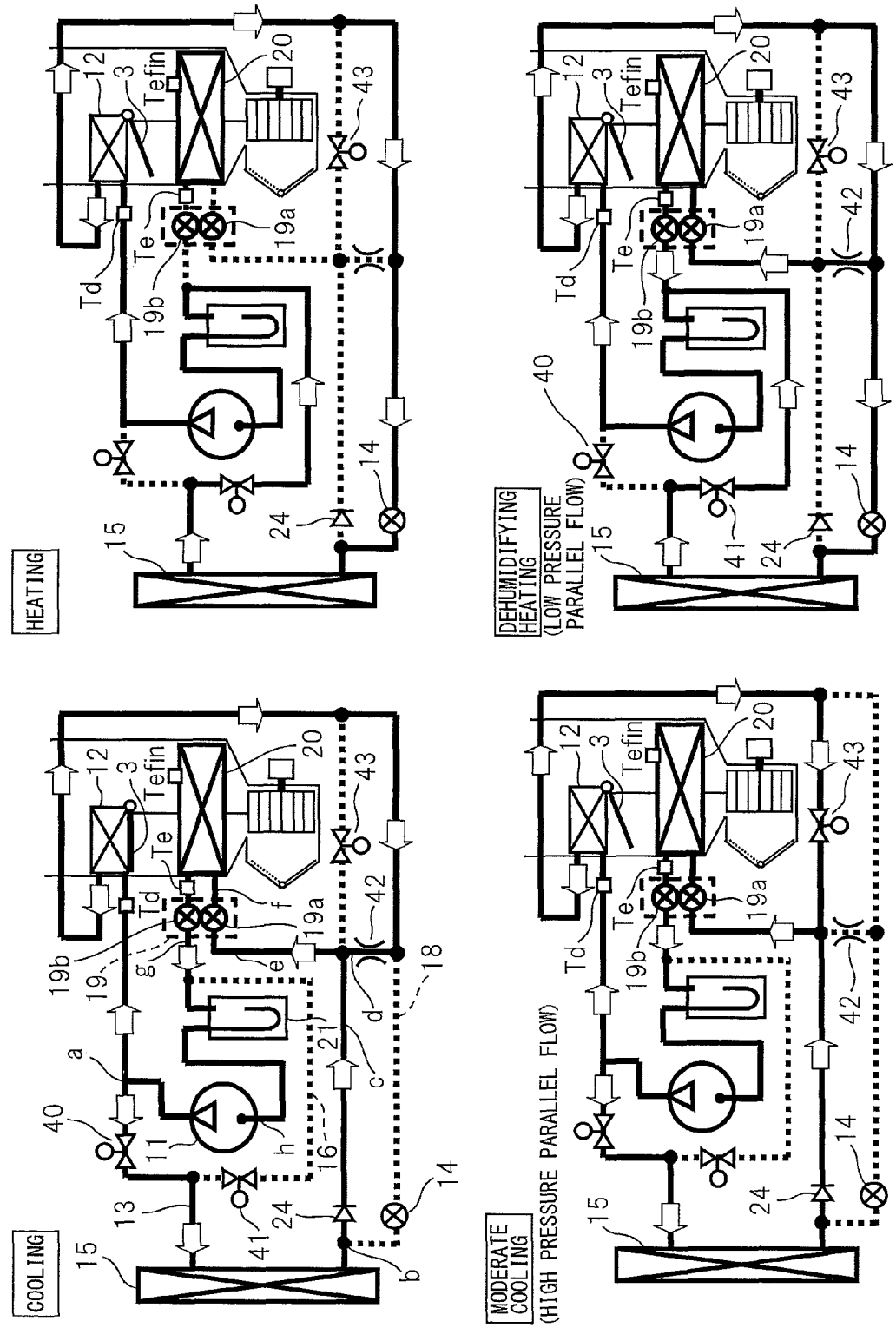
FIG. 16 is a view explaining the operation of a refrigeration cycle in different operation modes of a 10th embodiment of the present invention.

Referring to FIG. 16, a 10*th* embodiment will be explained. A solenoid valve 40 is provided which opens and closes the flow path between the discharge side of the compressor 11 and the outside heat exchanger 15. The solenoid valve 41 opens and closes the fifth refrigerant passage 16'. Downstream of the inside condenser 12, a fixed venturi which decreases the pressure of the refrigerant is arranged. At the passage which bypasses the fixed venturi 42, a solenoid valve 43 is set. The first expansion valve 14 adjusts the refrigerant flow rate to the outside heat exchanger at the time of heating to reduce the pressure of the refrigerant. At the time of cooling, the first expansion valve 14 is bypassed. The check valve 24 is set to enable flow from the outside heat exchanger 15 to the inlet flow control valve 19a. The flow regulating valve 19, in the same way as the second embodiment, comprises an inlet flow control valve 19a and an outlet flow regulating valve 19b.

The operating modes of the 10th embodiment will be explained. In the cooling mode, the solenoid valve 40 is opened and the solenoid valves 41 and 43 are closed. The flow of refrigerant is parallel to the flow of the compressor 11→outside heat exchanger 15→check valve 24→inlet flow control valve 19a→evaporator 20→accumulator 21→compressor 11 and becomes compressor 11→inside condenser 12→fixed venturi 42→outlet flow regulating valve 19b. The latter flow passes through the fixed venturi 42, so the flow resistance is high. A large portion of the refrigerant flows to the outside heat exchanger 15 side, the outside heat exchanger 15 discharges heat to the outside of the vehicle, then the inside evaporator 20 absorbs heat for the cooling operation.

Figure 17:
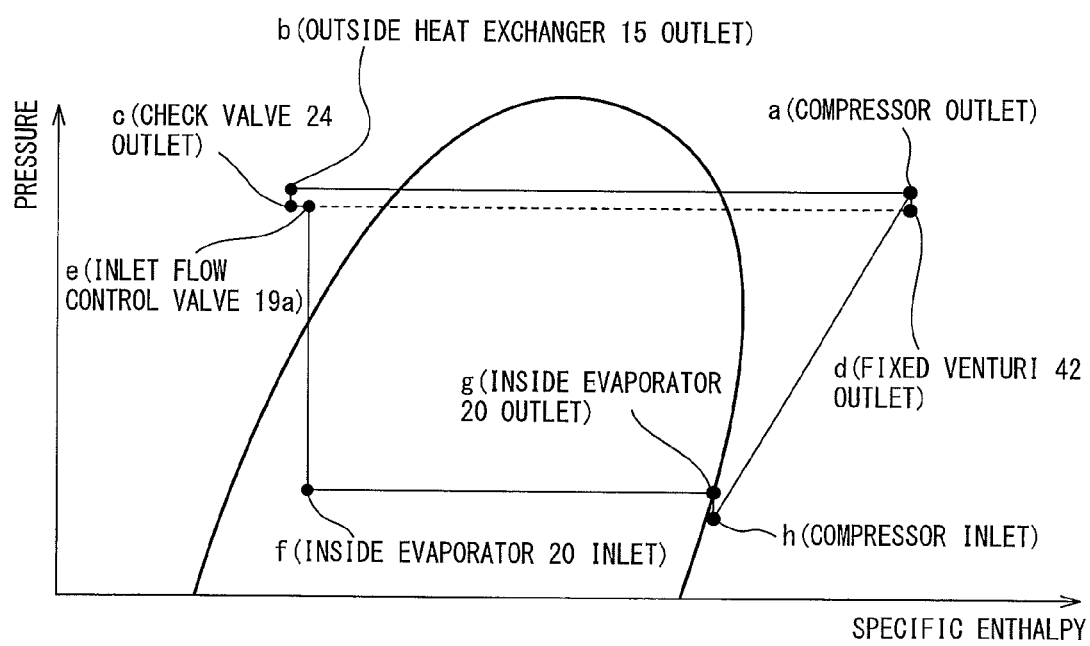
FIG. 17 is a Mollier chart of a refrigeration cycle in a cooling mode of a 10th embodiment of the present invention.

Referring to FIG. 17, the cooling mode will be explained on a Mollier chart. The refrigerant which flows from the compressor outlet "a" to the outside heat exchanger 15 discharges heat to the outside air and changes to the point of the outside heat exchanger outlet "b". On the other hand, the refrigerant which flows to the inside condenser 12 does not discharge heat when the air mix door 3 is closed, so changes to the point of the fixed venturi outlet "d". Ideally, if there is no pressure loss at the inside condenser 12 side, the point "a" and the point "d" become the same. The refrigerants at the point "c" and the point "d" merge and result in enthalpy of the inlet point "e" of the inlet flow control valve 19a. The refrigerant which flows to the outside heat exchanger 15 side is large, so the point "e" becomes close to the point "c". The refrigerant is reduced in pressure at the inlet flow control valve 19a and becomes low temperature, low pressure refrigerant at the point "f". Further, the refrigerant flows into the inside evaporator 20 where it absorbs heat from the passenger compartment air and the outlet of the inside evaporator 20 becomes the point "g" (outlet flow regulating valve 19b becomes wide open state). After this, the refrigerant passes through the accumulator 21 and reaches the compressor inlet "h". If there is no pressure loss at the flow path from the outlet of the inside evaporator 20 to the compressor inlet, the point "g" and the point "h" become the same.

At the heating mode, the solenoid valve 41 is opened and the solenoid valves 40 and 43 are closed. Further, the inlet flow control valve 19a is set to the closed state and closes the flow path to the inside evaporator 20. The flow of the refrigerant becomes the compressor 11→inside condenser 12→first expansion valve 14→outside heat exchanger 15→solenoid valve 41→accumulator 21→compressor 11. The inside condenser 12 is used to discharge heat into the passenger compartment, while the outside heat exchanger 15 is used to absorb heat from outside the vehicle for the heating operation.

The 10th embodiment includes a moderate cooling mode. This mode opens the solenoid valves 40 and 43 and closes the solenoid valve 41. Compared with the cooling operation, the fixed venturi 42 is bypassed by the solenoid valve 43. Due to this, the amount of refrigerant which flows to the inside condenser 12 is increased and the refrigerant is not only cooled, but also reheated by the inside condenser 12.

At the dehumidifying heating mode, the solenoid valve 41 is opened and the solenoid valves 40 and 43 are closed. The refrigerant passes through the compressor 11→inside heat exchanger 12, then branches. One parallel circuit uses the fixed venturi 42 to reduce the pressure of the refrigerant, renders the inlet flow control valve 19a the open state, runs refrigerant through it, absorbs heat at the inside evaporator 20, and dehumidifies the air of the passenger compartment. The outlet flow regulating valve 19b adjusts the refrigerant flow rate to maintain the predetermined evaporation pressure and prevent frost. The other parallel circuit runs through the first expansion valve 14→outside heat exchanger 15→solenoid valve 41→accumulator 21→compressor 11 and absorbs heat from outside the vehicle at the outside heat exchanger 15. This is basically the same as the second dehumidifying heating mode of the second embodiment.

(11th Embodiment)

Figure 18:
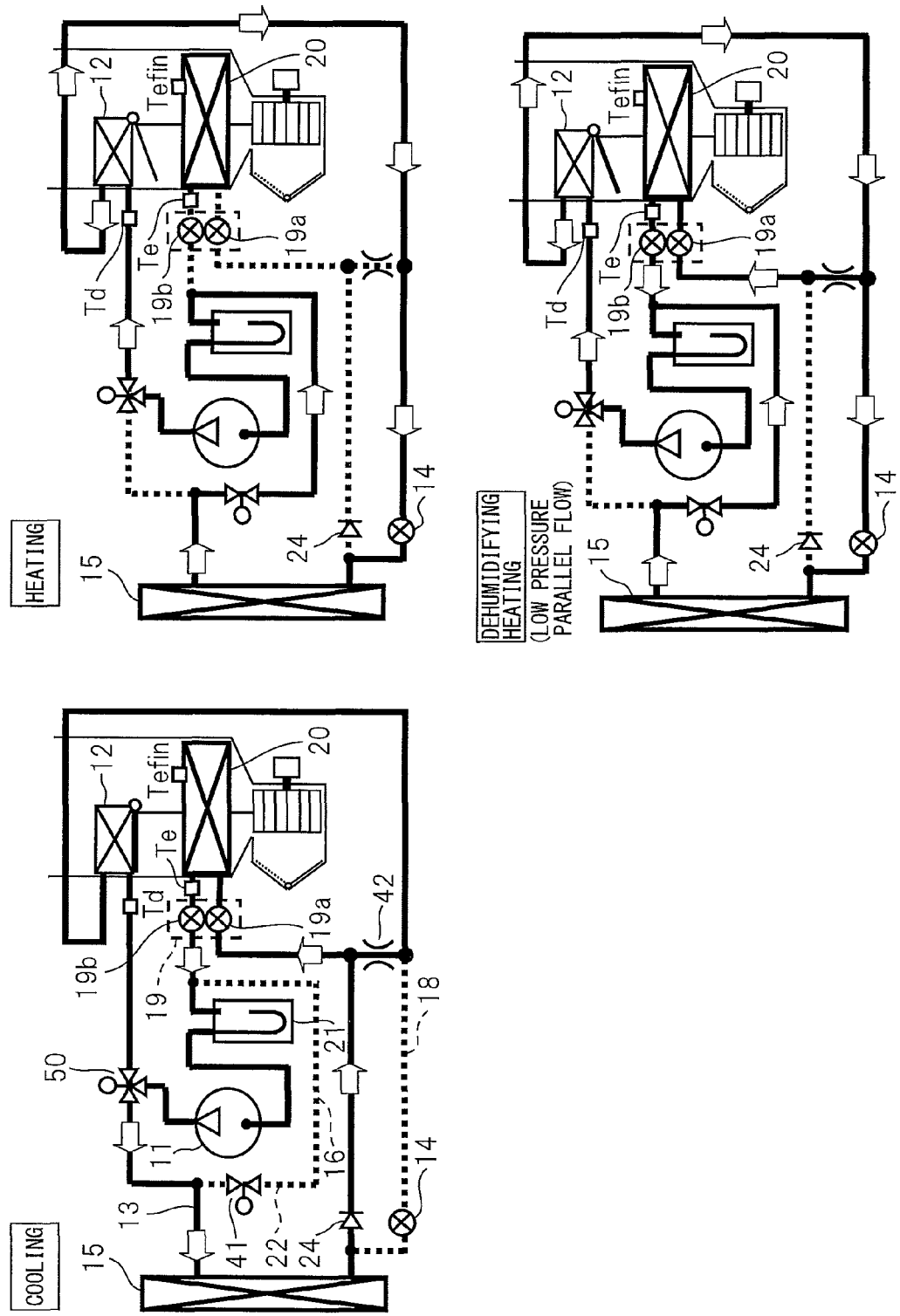
FIG. 18 is a view explaining the operation of a refrigeration cycle in different operation modes of an 11th embodiment of the present invention.

FIG. 18 shows an 11th embodiment when changing the solenoid valve at the discharge side of the compressor 11 of the 10th embodiment to a three-way valve 50. Here, an example which streamlines the configuration to eliminate the "moderate cooling mode" operation. Furthermore, the solenoid valve 43 and its flow path are eliminated. The rest is the same as the 10th embodiment. The operation is also similar.

REFERENCE SIGNS LIST 12 inside condenser
15 outside heat exchanger
19a inlet flow control valve
19b outlet flow regulating valve
20 inside evaporator

What is claimed is:

1. A flow regulating valve which is used in a refrigeration cycle system for air-conditioning use which has an inside condenser, outside heat exchanger, and inside evaporator, wherein
said flow regulating valve comprises an inlet flow control valve which is connected to an inlet side of said inside evaporator and functions as an expansion valve which reduces a pressure of and expands a refrigerant which flows into said inside evaporator in said refrigeration cycle system, and an outlet flow regulating valve which is connected to an outlet side of said inside evaporator and functions as an evaporation pressure regulator which adjusts the pressure to a predetermined target pressure where no frost forms in said inside evaporator;
said inlet flow control valve and said outlet flow regulating valve displace so that when the valve opening of one increases, the valve opening of the other decreases; and
when one of said inlet flow control valve and said outlet flow regulating valve is at a control opening which functions as the expansion valve or at a control opening which functions as the evaporation pressure regulator, the other of said inlet flow control valve and said outlet flow regulating valve is at a fully open state where the flow of refrigerant is substantially not throttled.

2. The flow regulating valve according to claim 1, wherein said inlet flow control valve and said outlet flow regulating valve are respectively driven by a single actuator.

3. The flow regulating valve according to claim 1, wherein
said inlet flow control valve is provided with a lead-in connection hole which is formed in the body and leads in the refrigerant and a lead-out connection hole which is formed in said body and leads out refrigerant to said inside evaporator,
said outlet flow regulating valve is provided with a lead-out connection hole which is formed in said body and leads the refrigerant to the outside and a lead-in connection hole which is formed in said body and leads in refrigerant from said inside evaporator, and
said lead-out connection hole of said inlet flow control valve and said lead-in connection hole of said outlet flow regulating valve are formed in said body adjoining each other.

4. The flow regulating valve according to claim 1, wherein
said inlet flow control valve is provided with a lead-in connection hole which is formed in an expansion valve block and leads in a refrigerant from the outside and a lead-out connection hole which is formed in said expansion valve block and leads out a refrigerant to said inside evaporator,
said outlet flow regulating valve is provided with a lead-out connection hole which is formed in an evaporation pressure regulator block and leads out a refrigerant to the outside and a lead-in connection hole which is formed in said evaporation pressure regulator block and leads in a refrigerant from said inside evaporator, and
said expansion valve block and said evaporation pressure regulator block are connected.

5. The flow regulating valve according to claim 1, wherein said inlet flow control valve and said outlet flow regulating valve are poppet valves which are respectively comprised of valve elements and valve seats on which the valve elements are seated and wherein the two valve elements are connected by a single shaft or are simultaneously operated.

6. The flow regulating valve according to claim 1, wherein said inlet flow control valve and said outlet flow regulating valve are poppet valves which are respectively comprised of valve elements and valve seats on which the valve elements are seated and wherein of the two valve elements, at least one valve element is formed separated to be able to abut against a shaft which drives the valve element, and the other valve element is biased by a spring in the direction of said shaft.

7. The flow regulating valve according to claim 1, wherein said inlet flow control valve and said outlet flow regulating valve are slide valves which respectively are provided with cylinders and pistons which slide inside the cylinders and can change in opening areas in accordance with displacement of said pistons and wherein two pistons are connected by a single shaft or simultaneously operate.

8. The flow regulating valve according to claim 1, wherein said inlet flow control valve and said outlet flow regulating valve are rotary valves which respectively are provided with cylinders and rotors which rotate inside the cylinders and can change in opening areas in accordance with the rotational angles of said rotors and wherein two rotors are connected by a single shaft or simultaneously operate.

9. The flow regulating valve according to claim 1, wherein one or both of said inlet flow control valve and said outlet flow regulating valve is either a poppet valve, slide valve, or rotary valve.

10. The flow regulating valve according to claim 1, wherein said outlet flow regulating valve is provided with a bypass flow path which allows passage of a predetermined flow rate even when closed.

11. The flow regulating valve according to claim 1, wherein said refrigeration cycle system includes
a main refrigerant circuit which comprises a compressor, said inside condenser, first expansion valve, said outside heat exchanger, and said compressor arranged in that order,
a bypass refrigerant circuit which is branched between said inside condenser and first expansion valve, comprises said inlet flow control valve, said inside evaporator, and said outlet flow regulating valve arranged in that order, and returns to said main refrigerant circuit between said outside heat exchanger and said compressor at said main refrigerant circuit, and a connecting refrigerant passage which connects from downstream said outside heat exchanger to said bypass refrigerant circuit.

12. The flow regulating valve according to claim 1, wherein the refrigeration cycle system operates in a cooling mode, a first dehumidifying heating mode and a second dehumidifying heating mode;

when operating in the cooling mode, the outlet flow regulating valve is in the fully open state;

when operating in the first dehumidifying heating mode, the outlet flow regulating valve is in the fully open state; and when operating in the second dehumidifying heating mode, the inlet flow control valve is in the fully open state.

13. A flow regulating valve which is used in a refrigeration cycle system for air-conditioning use which has an inside condenser, outside heat exchanger, and inside evaporator, wherein said flow regulating valve comprises an inlet flow control valve which is connected to an inlet side of said inside evaporator and functions as an expansion valve which reduces a pressure of and expands a refrigerant which flows into said inside evaporator in said refrigeration cycle system, and an outlet flow regulating valve which is connected to an outlet side of said inside evaporator and functions as an evaporation pressure regulator which adjusts the pressure to a predetermined target pressure where no frost forms in said inside evaporator, said inlet flow control valve and said outlet flow regulating valve displace so that when the valve opening of one increases, the valve opening of the other decreases, said inlet flow control valve and said outlet flow regulating valve are poppet valves which are respectively comprised of valve elements and valve seats on which the valve elements are seated and wherein the two valve elements are connected by a single shaft or are simultaneously operated; and said inlet flow control valve and said outlet flow regulating valve are poppet valves and wherein said inlet flow control valve is provided with a sub valve which decreases the opening area of said inlet flow control valve if the valve element of said inlet flow control valve separates from the valve seat by a predetermined amount or more.

\* \* \* \* \*